United States Patent [19]

Sawada

[11] Patent Number: 5,724,210
[45] Date of Patent: Mar. 3, 1998

[54] MAGNETIC RECORDING/REPRODUCING APPARATUS WITH MAGNETIC DISC ENGAGING/DISENGAGING MECHANISM

[75] Inventor: Toru Sawada, Fukushima-ken, Japan

[73] Assignee: Alps Electric Co., Ltd., Tokyo, Japan

[21] Appl. No.: 703,157

[22] Filed: Aug. 21, 1996

[30] Foreign Application Priority Data

Sep. 11, 1995 [JP] Japan .................. 7-232864

[51] Int. Cl.$^6$ .................. G11B 17/00; G11B 5/016; G11B 33/02
[52] U.S. Cl. .................. 360/99.06; 360/99.02; 369/77.2
[58] Field of Search .................. 360/99.06, 99.02; 369/77.2, 75.2

[56] References Cited

U.S. PATENT DOCUMENTS

| | | | |
|---|---|---|---|
| 5,163,038 | 11/1992 | Arai | 369/77.2 |
| 5,231,623 | 7/1993 | Kanno et al. | 369/75.2 |
| 5,335,124 | 8/1994 | Yokota | 360/99.02 |
| 5,438,465 | 8/1995 | Noda | 360/75 |
| 5,587,856 | 12/1996 | Aoyama | 360/99.06 |

*Primary Examiner*—Stuart S. Levy
*Assistant Examiner*—David D. Davis
*Attorney, Agent, or Firm*—Guy W. Shoup

[57] ABSTRACT

The present invention relates to a magnetic recording/reproducing apparatus. In the magnetic recording/reproducing apparatus, a shutter actuating pin and a locking claw are formed integrally with a rotating member, the rotating member is rotatably supported on a chassis, one end of a torsion coil spring wound around the rotating member is retained by the shutter actuating pin, and a bent portion of the other end of the torsion coil spring is retained by a retainer hole of a holder. Before loading of a disc cartridge, a slide plate is locked by the locking claw at a backward position, so that a holder is maintained at an unloading position, whereas, when the disc cartridge is loaded, the rotating member is rotated by the disc cartridge, so that locking by the locking claw is dismissed to allow the holder to be shifted to a loading position while enabling a shutter of the disc cartridge to be opened by the shutter actuating pin.

5 Claims, 25 Drawing Sheets

MAGNETIC RECORDING/REPRODUCING APPARATUS WITH MAGNETIC DISC ENGAGING/DISENGAGING MECHANISM

BACKGROUND OF THE INVENTION

1. Field of the Invention

The present invention relates to a magnetic recording/reproducing apparatus, and more particularly, to a shutter opening and closing mechanism for use in shifting a loaded disc cartridge from an unloading position to a loading position.

2. Description of the Related Art

In a magnetic recording/reproducing apparatus for recording and/or reproducing information on or from a magnetic disc contained in a disc cartridge, it is necessary that a shutter provided in the disc cartridge is opened so as to expose the magnetic disc contained in the disc cartridge when the disc cartridge is loaded.

Hitherto, as such a shutter actuating mechanism, a mechanism has been known in which a shutter actuating plate is hinged on the upper surface of a holder and the shutter actuating plate is urged by a spring in one direction. The holder moves the disc cartridge up and down between an unloading position and a loading position in cooperation with a slide plate. The slide plate is placed on a chassis for forward and backward movement, and is urged by a tension spring in the direction of forward movement thereof. In addition, a locking plate is rotatably supported on the chassis. The locking plate is urged by a spring in the direction where the locking plate is locked by a stopper of the slide plate, whereby the holder and the slide plate are maintained at an unloading position of the disc cartridge.

In such a known magnetic recording/reproducing apparatus, before loading of the disc cartridge, the stopper of the slide plate is locked with the locking plate at a backward position, and the holder is maintained at a loading position. On the other hand, when the disc cartridge is inserted into the holder, the shutter actuating plate is, in the course of insertion thereof, brought into abutment with the disc cartridge to be rotated on the upper surface of the holder, so that a shutter provided in the disc cartridge is opened by a shutter actuating plate. When the disc cartridge is further inserted into the holder, since the locking plate is brought into abutment with the disc cartridge so as to be rotated and the locking of the stopper and the locking plate is dismissed, the slide plate is shifted by the tension spring in the direction of forward movement of the chassis, and the holder moves downward along a cam groove of the slide plate. Therefore, at the loading position of the disc cartridge, a magnetic disc accommodated in the disc cartridge is exposed, and information from a magnetic head is recorded/reproduced on or from the magnetic disc.

However, according to the conventional magnetic recording/reproducing apparatus as described above, it is necessary that the shutter actuating plate for opening and closing the shutter of the disc cartridge and a locking plate for maintaining the slide plate at the backward position are provided at separate regions, respectively. Therefore, the number of parts or components and the number of assemblers are increased, thereby preventing cost reduction. In addition, springs are required for the shutter opening and closing plate and for the locking plate, respectively. This also prevents the cost reduction.

SUMMARY OF THE INVENTION

It is therefore an object of the present invention to provide a simply constructed and low-cost magnetic recording/reproducing apparatus by simplifying the shutter actuating mechanism and the locking mechanism.

According to an aspect of the present invention, there is provided a magnetic recording/reproducing apparatus comprising a slide plate placed on a chassis for forward and backward movement, and urged forward by a spring; a holder for moving a disc cartridge up and down between an unloading position and a loading position in cooperation with said slide plate; and a rotating member rotatably supported on the chassis, and having a locking claw and a shutter actuating pin formed integrally therewith, wherein, before loading of the disc cartridge, the slide plate is locked by the locking claw at a backward position, so that the holder is maintained at the unloading position, whereas, when the disc cartridge is loaded, the rotating member is rotated by the disc cartridge, so that the locking by the locking claw is dismissed to allow the holder to be shifted to the loading position while enabling a shutter of the disc cartridge to be opened by the shutter actuating pin.

In the magnetic recording/reproducing apparatus constructed as described above, a torsion coil spring is wound around the rotating member, one free end of the torsion coil spring is retained by the shutter actuating pin and a bent portion formed at the other free end of the torsion coil spring is retained by a retainer hole, so that the bent portion serves as a wrong insertion preventive spring for the disc cartridge.

In addition, in the magnetic recording/reproducing apparatus constructed as described above, slits extending toward the axial direction of the rotating member are formed at the upper portion of the rotating member, and the torsion coil spring is wound around supporting walls which are separated by the slits.

Before unloading of the disc cartridge, the locking claw formed on the rotating member is locked with the slide plate at a backward position, and the holder and the slide plate are maintained at an unloading position. On the other hand, when the disc cartridge is inserted into the holder, the shutter actuating pin is, in the course of insertion thereof, brought into abutment with the disc cartridge to rotate the rotating member, so that a shutter provided in the disc cartridge is started to open by means of the shutter actuating pin. When the disc cartridge is further inserted into the holder, the rotating member is kept rotating in accordance with the insertion. Since the locking of the by the locking claw is dismissed when the rotating member is rotated at a predetermined angle, the slide plate is shifted in the direction of forward movement of the chassis, and the holder moves downward to the loading position together with the disc cartridge in cooperation with the slide plate.

DESCRIPTION OF THE PREFERRED EMBODIMENT

The embodiment of the present invention will now be described with reference to the accompanying drawings.

Figure 1:
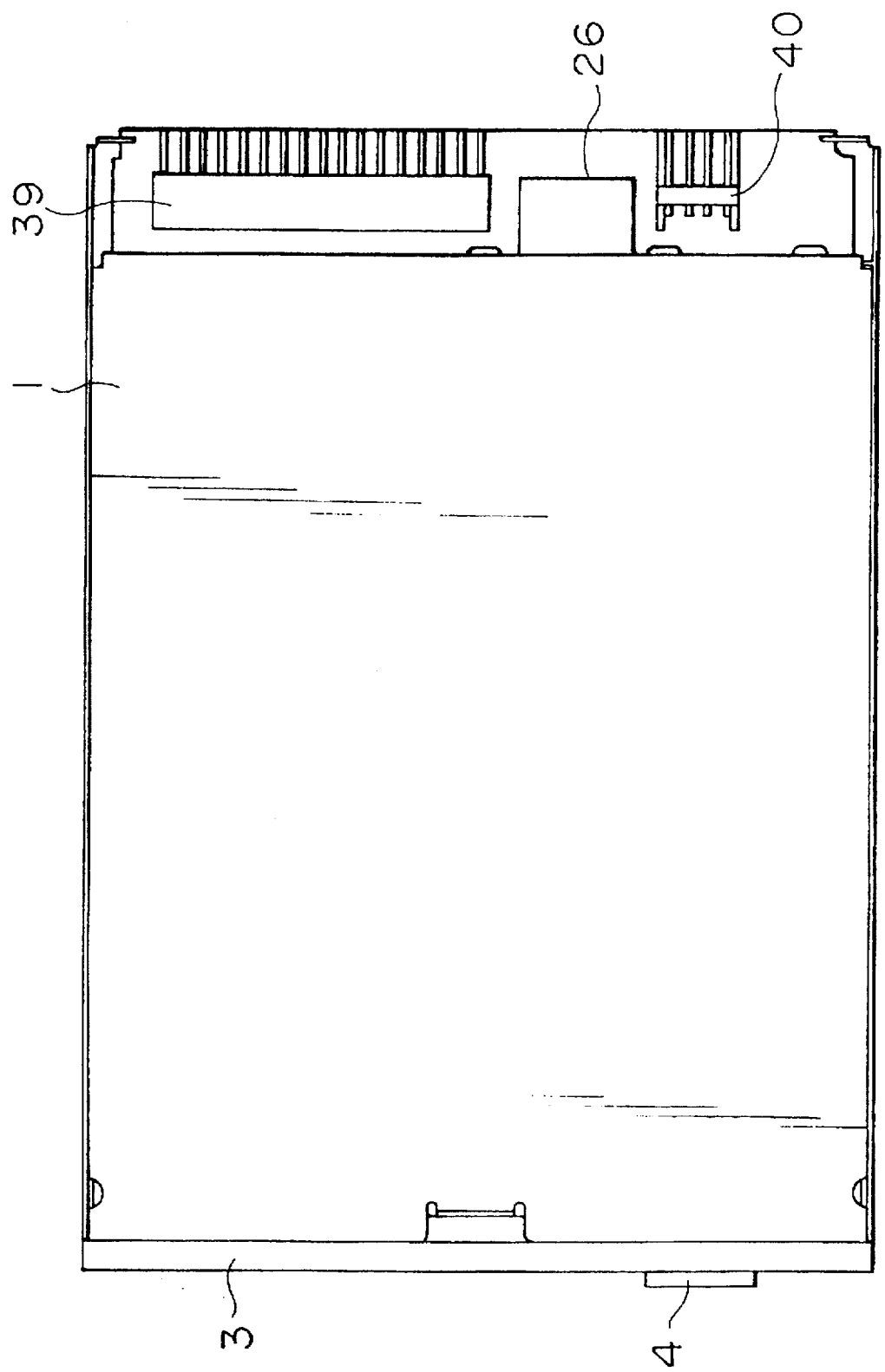
FIG. 1 is a plan view showing a magnetic recording/reproducing apparatus according to an embodiment of the present invention.
Figure 2:
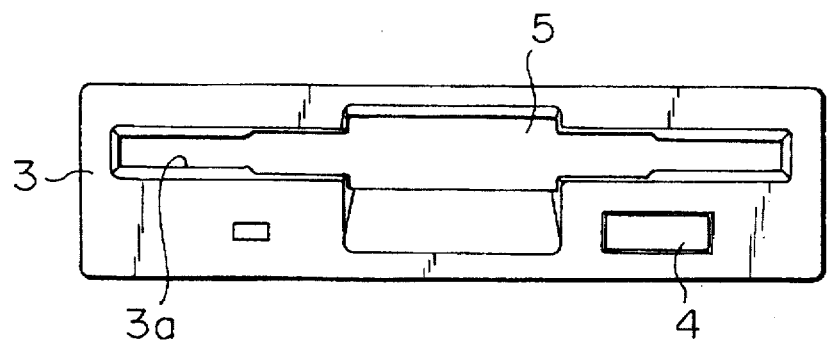
FIG. 2 is a front view of the magnetic recording/reproducing apparatus.
Figure 3:
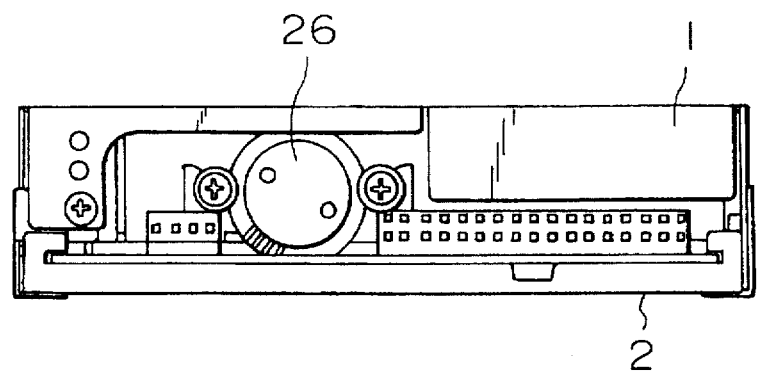
FIG. 3 is a rear elevation of the magnetic recording/reproducing apparatus.
Figure 4:
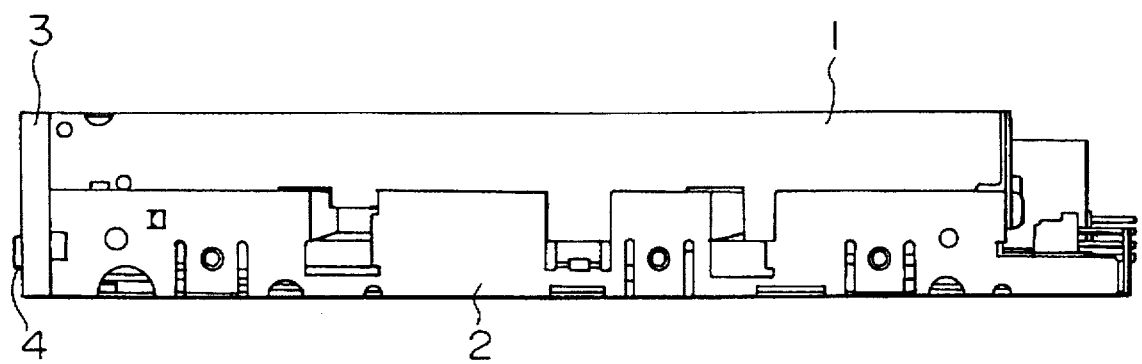
FIG. 4 is a side view of the magnetic recording/reproducing apparatus.
Figure 5:
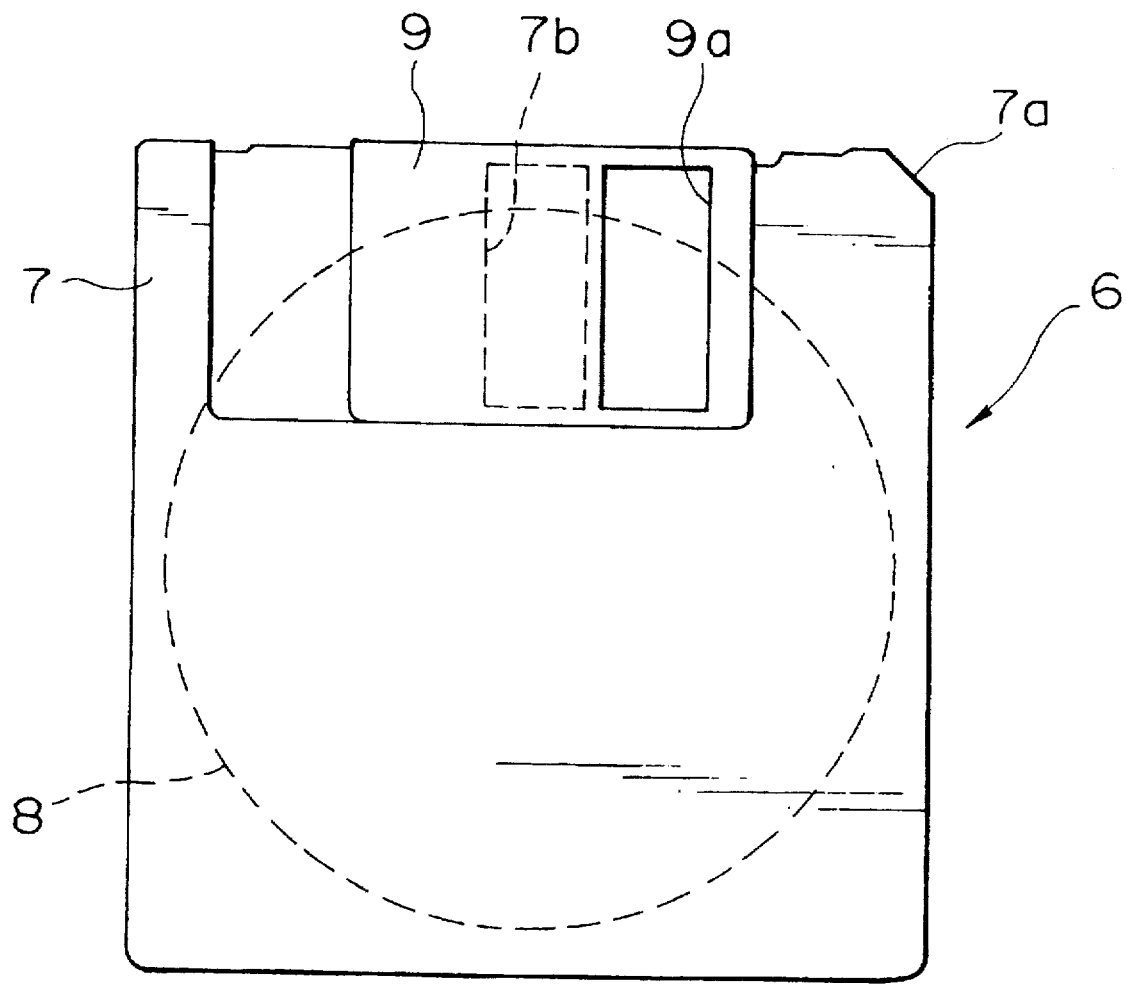
FIG. 5 is a plan view showing a disc cartridge according to the present invention.
Figure 6:
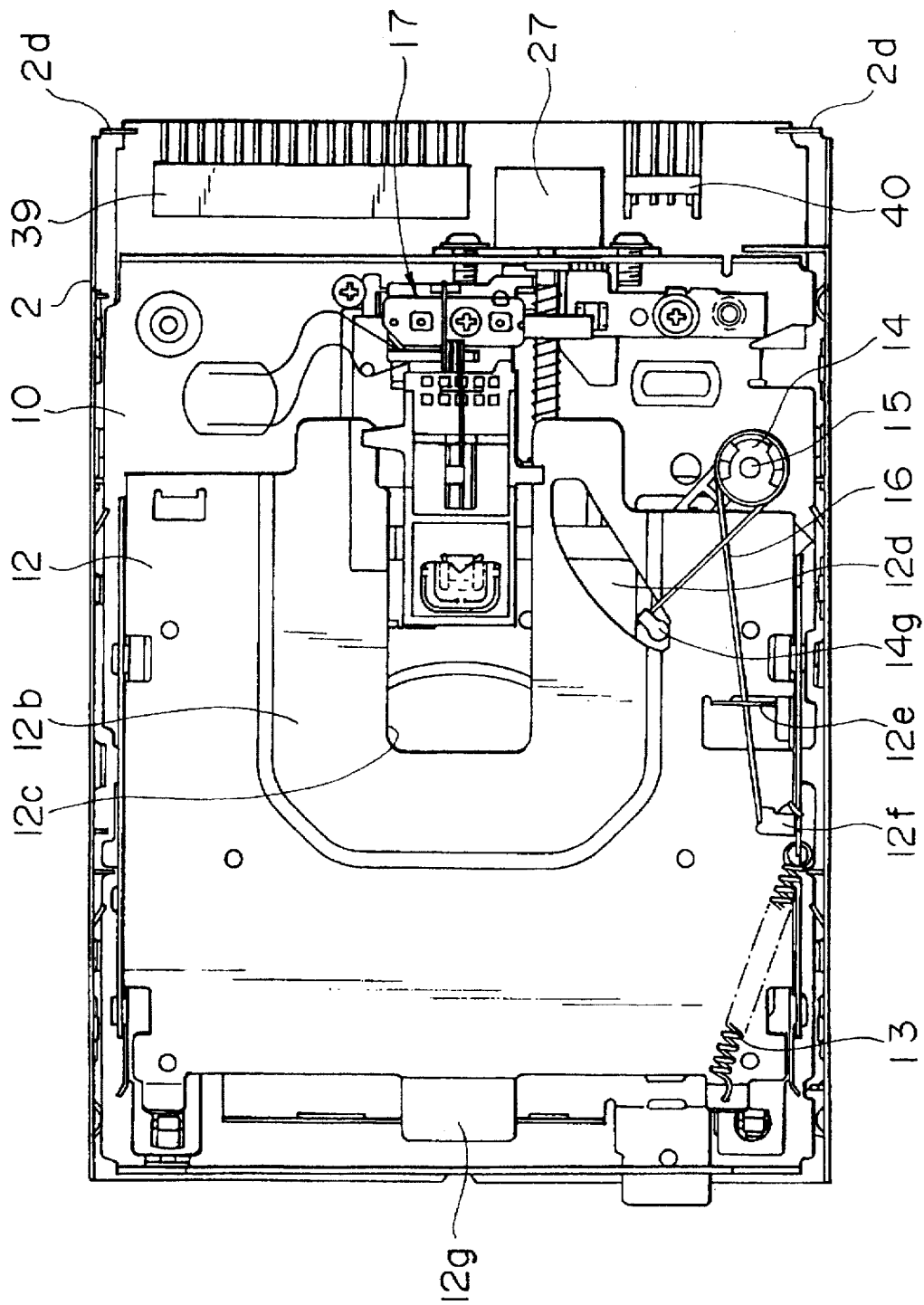
FIG. 6 is a plan view showing the magnetic recording/reproducing apparatus of FIG. 1 from which an upper cover is removed.
Figure 7:
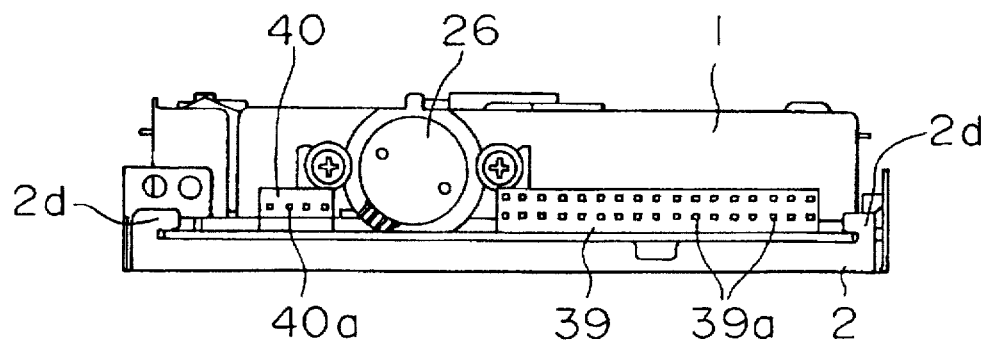
FIG. 7 is a rear elevation of FIG. 6.
Figure 8:
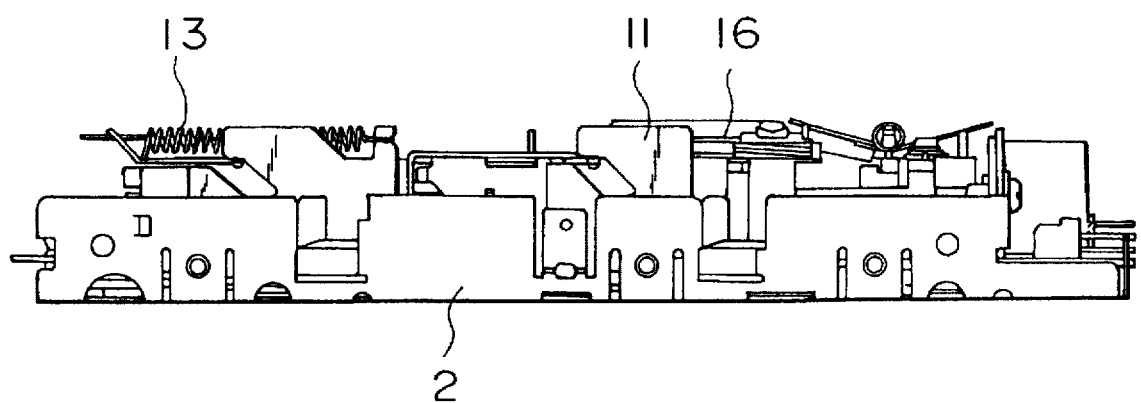
FIG. 8 is a side view of FIG. 6.
Figure 9:
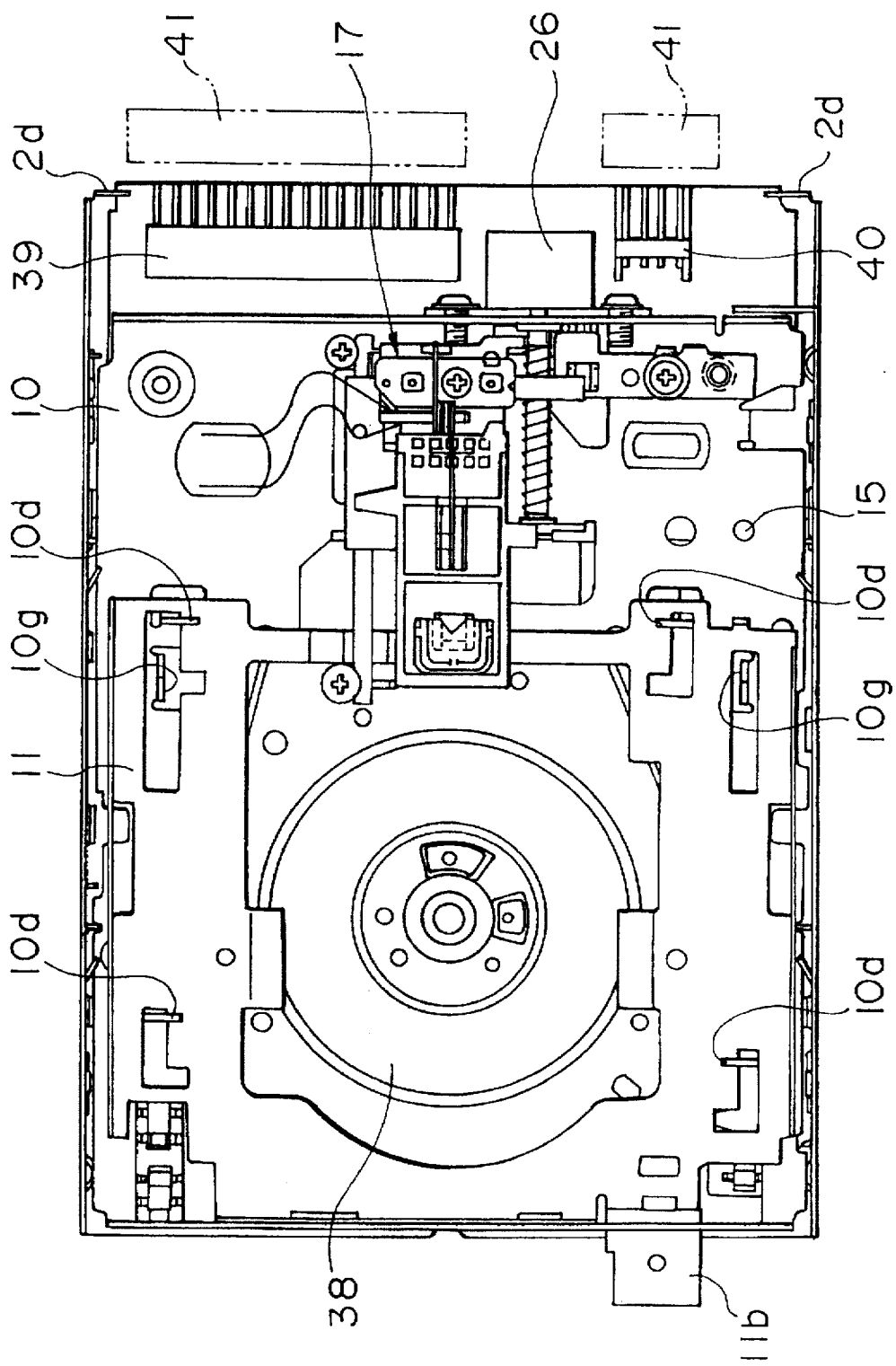
FIG. 9 is a plan view showing the magnetic recording/reproducing apparatus of FIG. 6 from which a holder is removed.
Figure 10:
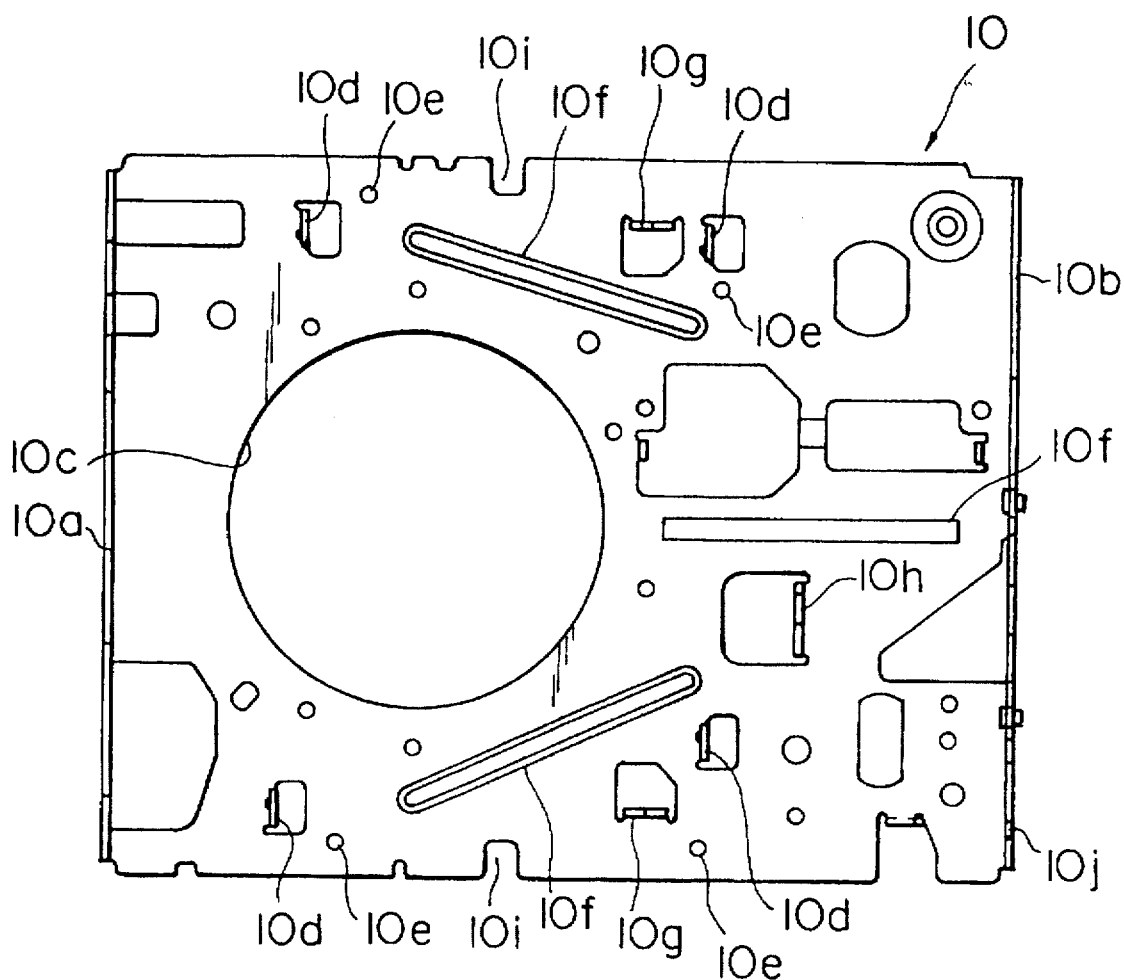
FIG. 10 is a plan view showing a chassis included in the magnetic recording/reproducing apparatus.
Figure 11:
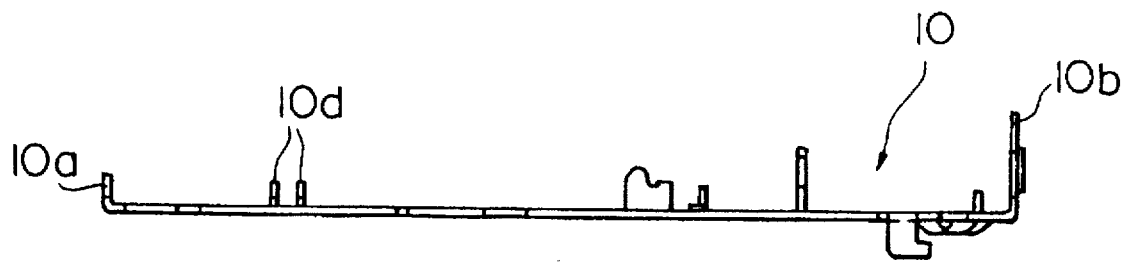
FIG. 11 is a side view of the chassis.
Figure 12:
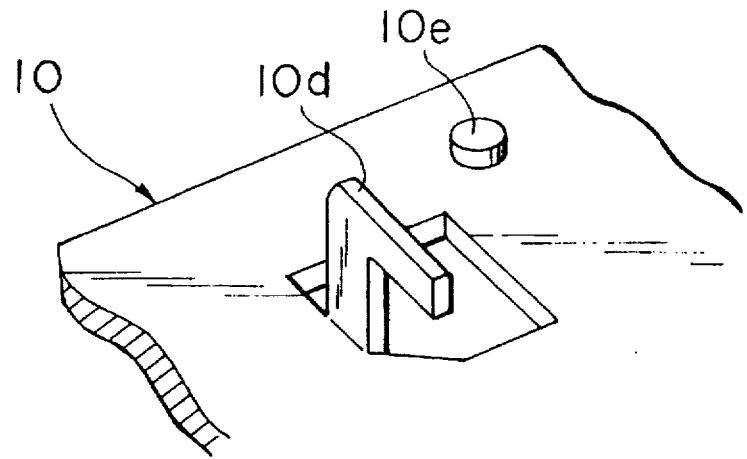
FIG. 12 is a perspective view showing a guide projection and a dowel of the chassis.
Figure 13:
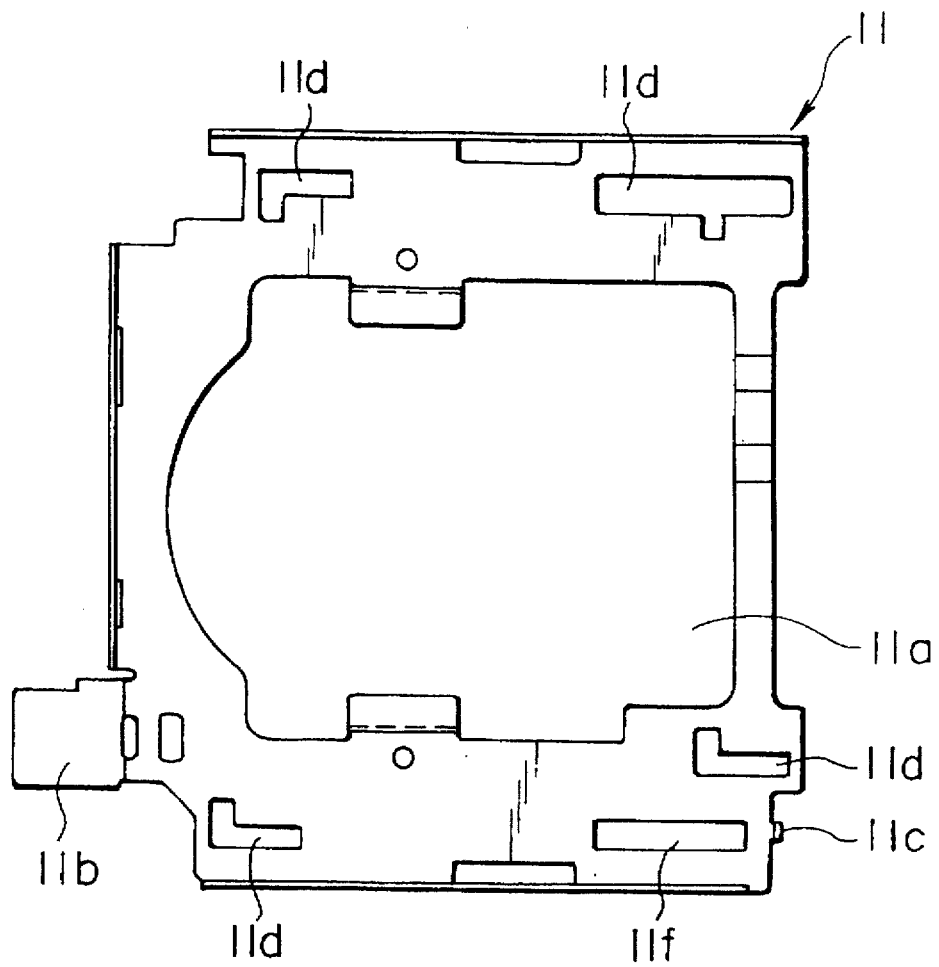
FIG. 13 is a plan view showing a slide plate included in the magnetic recording/reproducing apparatus.
Figure 14:
FIG. 14 is a rear elevation of the slide plate.
Figure 15:
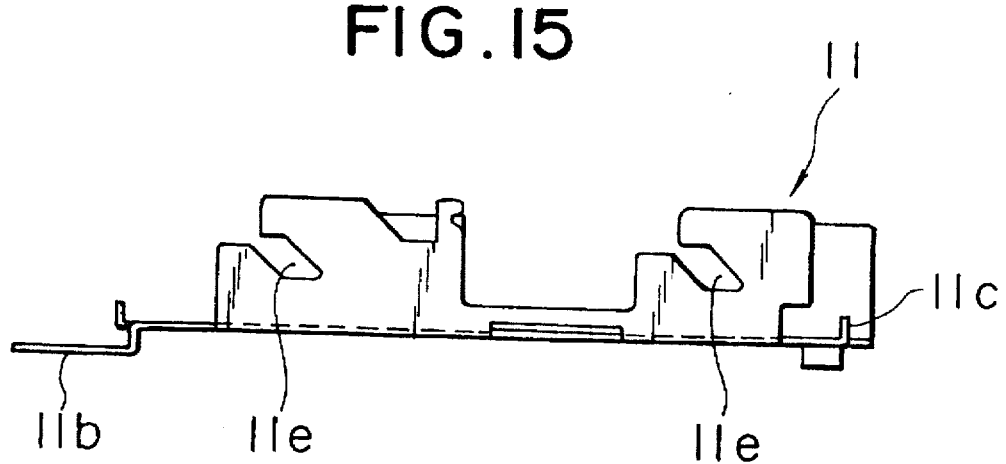
FIG. 15 is a side view of the slide plate.
Figure 16:
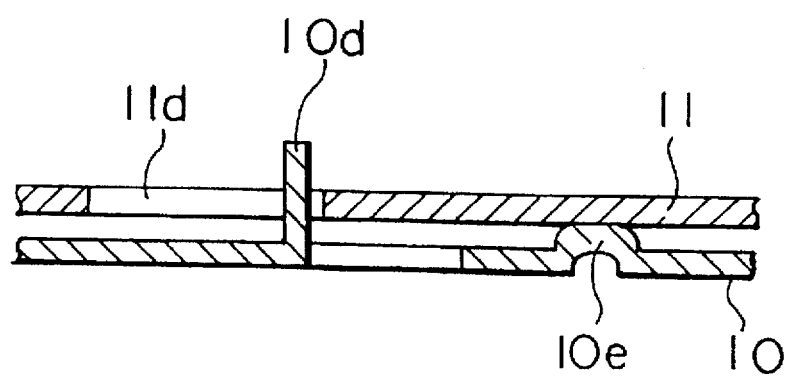
FIG. 16 is a sectional view showing a state where the chassis is engaged with the slide plate.
Figure 17:
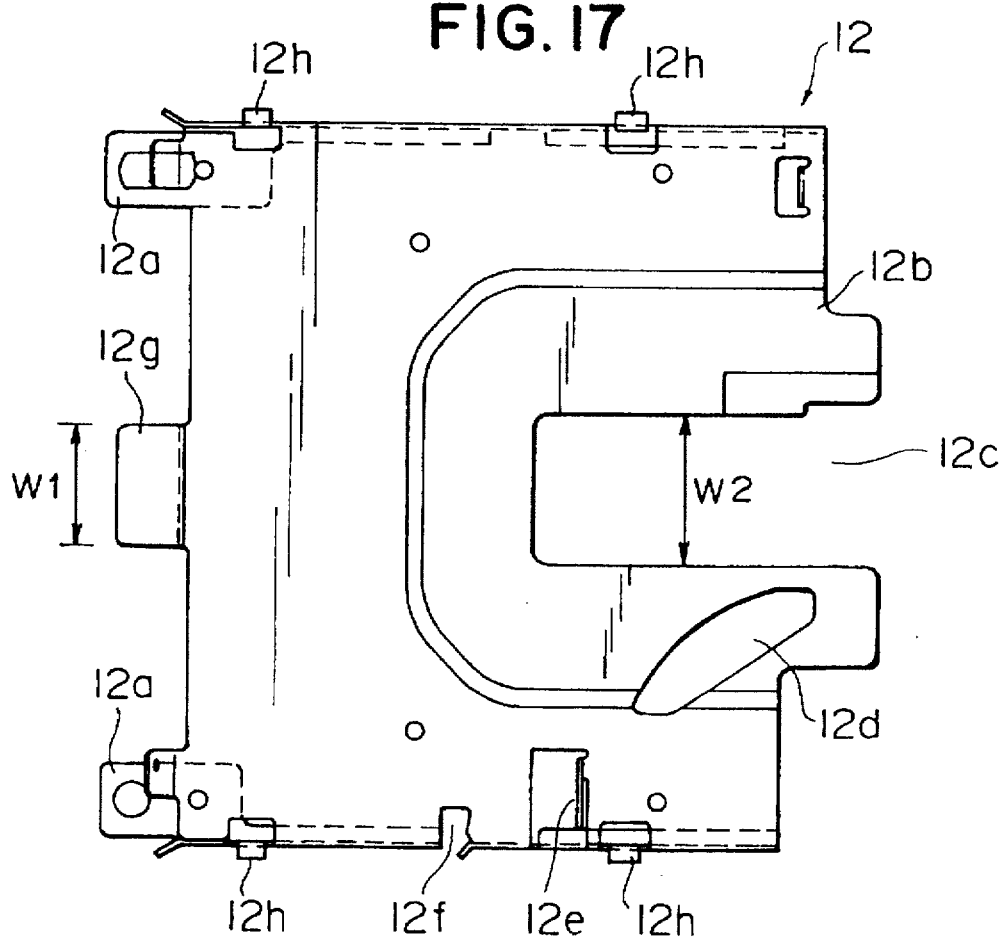
FIG. 17 is a plan view showing a holder included in the magnetic recording/reproducing apparatus.
Figure 18:
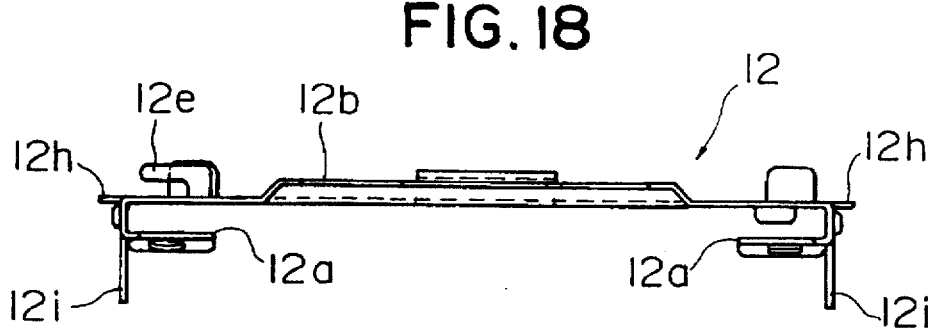
FIG. 18 is a rear elevation of the holder.
Figure 19:
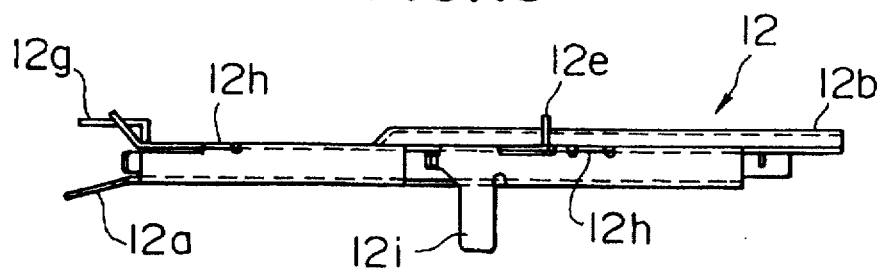
FIG. 19 is a side view of the holder.
Figure 20:
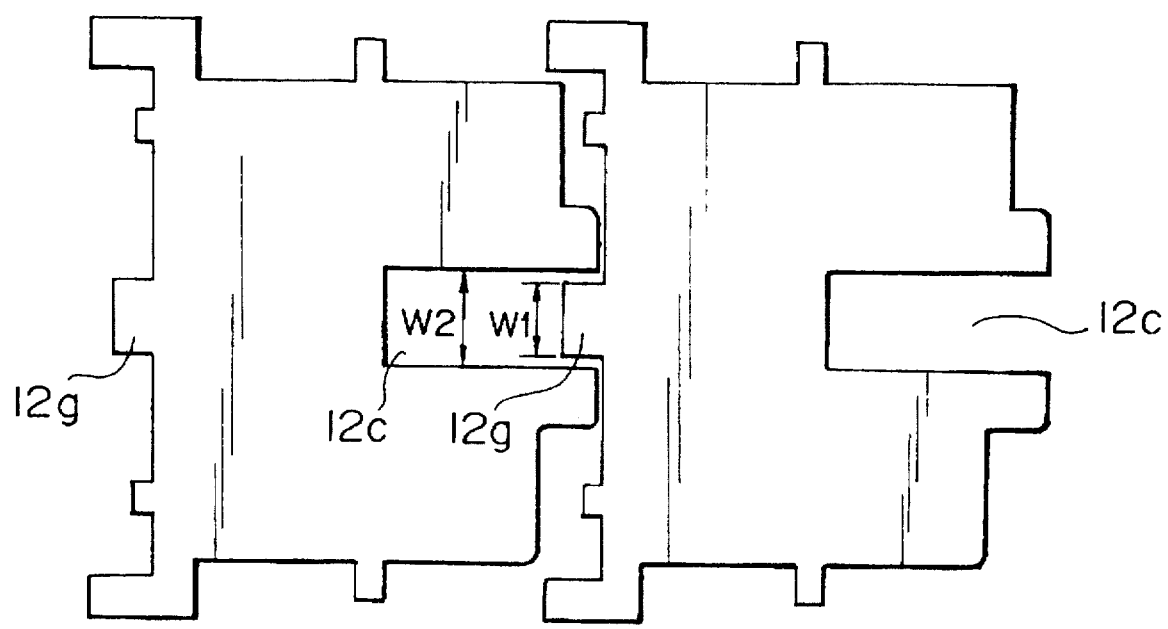
FIG. 20 illustrates a state where the holder is punched out of a blank sheet.
Figure 21:
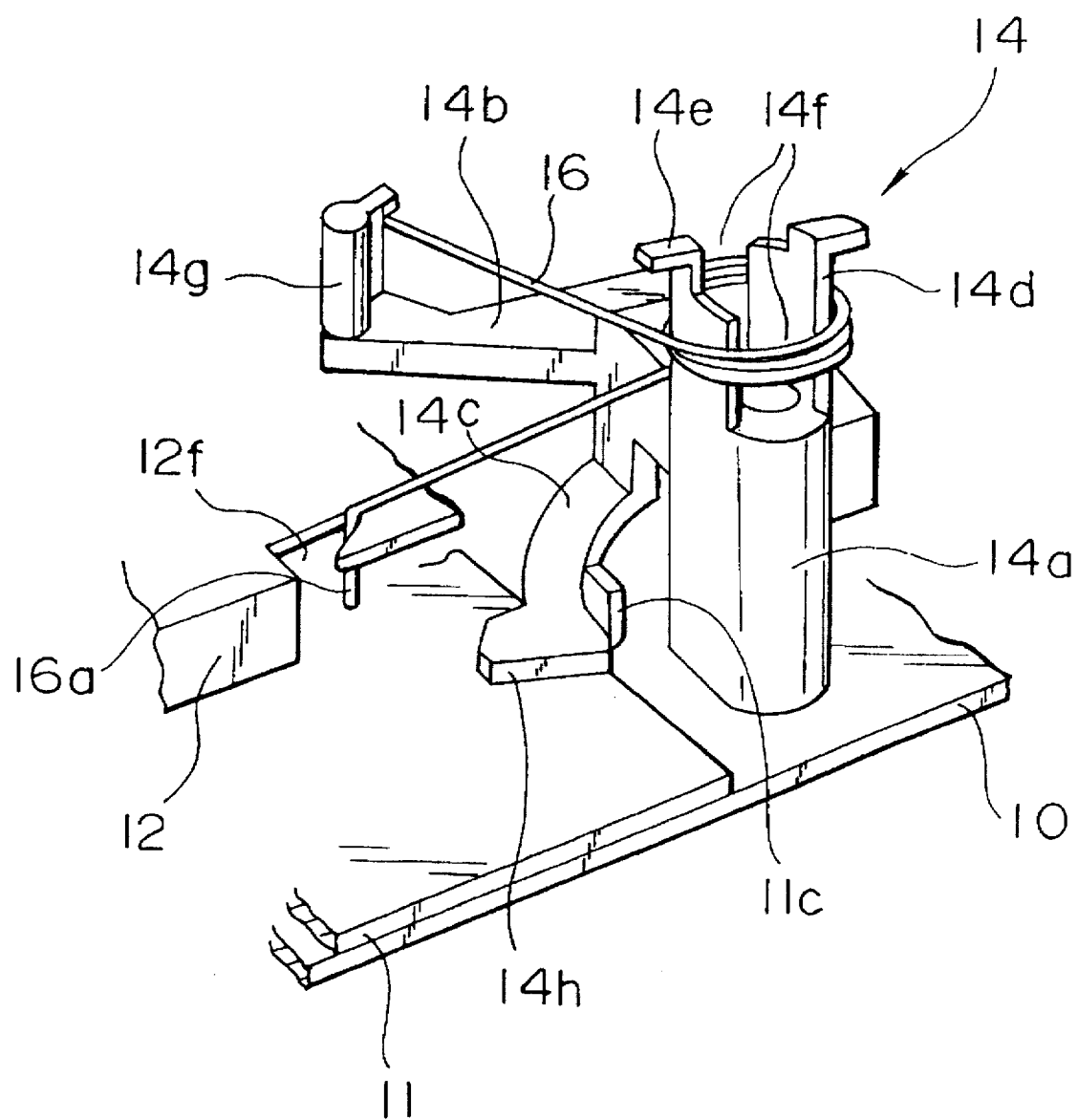
FIG. 21 is a perspective view showing a main part of a shutter actuating mechanism included in the magnetic recording/reproducing apparatus.

FIGS. 1 to 47 illustrate an embodiment of the present invention. FIG. 1 is a plan view of a magnetic recording/reproducing apparatus according to the present invention; FIG. 2 is a front view of the magnetic recording/reproducing apparatus; FIG. 3 is a rear elevation of the magnetic recording/reproducing apparatus; FIG. 4 is a side view of the magnetic recording/reproducing apparatus; FIG. 5 is a plan view showing a disc cartridge; FIG. 6 is a plan view showing the magnetic recording/reproducing apparatus of FIG. 1 from which an upper cover is removed; FIG. 7 is a rear elevation of FIG. 6; FIG. 8 is a side view of FIG. 6; FIG. 9 is a plan view showing the magnetic recording/reproducing apparatus of FIG. 6 from which a holder is removed; FIG. 10 is a plan view of a chassis; FIG. 11 is a side view of the chassis; FIG. 12 is a perspective view showing a guide projection and a dowel of the chassis; FIG. 13 is a plan view of a slide plate; FIG. 14 is a rear elevation of the slide plate; FIG. 15 is a side view of the slide plate; FIG. 16 is a sectional view showing a state where the chassis is engaged with the slide plate; FIG. 17 is a plan view of a holder; FIG. 18 is a rear elevation of the holder; FIG. 19 is a side view of the holder; FIG. 20 illustrates a state where the holder is punched out of a blank sheet; and FIG. 21 is a perspective view showing a main part of a shutter opening and closing mechanism.

As shown in FIGS. 1 to 4, a magnetic recording/reproducing apparatus according to the present invention is comprised of an upper cover 1 and a lower cover 2 which are joined and integrated to each other so as to form a case, a main mechanism body accommodated within a space formed between the upper and lower covers 1 and 2, and a front panel 3 mounted to a front opening of the upper and lower covers 1 and 2. A laterally long-shaped insertion opening 3a is formed in the front panel 3, and an eject button 4, which will be described later, is provided for movement into and out of the apparatus. A leaf 5 is hinged at the back side of the front panel 3. The leaf 5 is urged by a coil spring (not shown) in the direction of closing the insertion opening 3a.

A disc cartridge 6 used in the magnetic recording/reproducing apparatus is a known one, and is comprised of a cartridge case 7 formed by a hard plastic, a magnetic disc 8 rotatably accommodated in the cartridge case 7, and a shutter 9 reciprocable along one edge of the cartridge case 7, as shown in FIG. 5. A corner of the cartridge case 7 is cut off into a tapered shape, and the cut off portion is a wrong (incorrect) insertion preventive portion 7a. The shutter 9 is bent into a U-shape, and rectangle window openings 9a are formed in both upper and lower surfaces thereof, and an opening 7b corresponding to the window openings 9a is also formed in the cartridge case 7. The shutter 9 is urged by a spring (not shown) in the direction of closing the opening 7b. However, when the disc cartridge is inserted therein from the insertion opening 3a of the front panel 3, it is shifted by a shutter actuating mechanism, which will be described later, in such a direction that the opening 7b aligns with the window openings 9a, so that the magnetic disc 8 is exposed from the opening 7b and window openings 9a.

As shown in FIGS. 6 to 9, the main mechanism body is comprised of a chassis 10 fixed on the upper surface of the lower cover 2, a slide plate 11 mounted on the upper surface of the chassis 10 for forward and backward movement, and a holder 12 held by the slide plate 12. The constructions of the chassis 10, slide plate 11 and holder 12 will be specifically described below.

As a material of the chassis 10, an iron sheet, which is a blank sheet, having galvanized upper and lower surfaces is used.

As shown in FIGS. 10 to 12, the chassis 10 is bent at its both front and rear ends to form rising walls 10a and 10b, respectively, and a circular opening 10c is formed in the vicinity of the front rising wall 10a. Around the circular opening 10c are formed a plurality of L-shaped guide projections 10d which are bent perpendicular to the bottom. Two guide projections 10d are formed per one side of the chassis 10, total four guide projections 10d are formed on both left and right sides of the chassis 10. A plurality of dowels 10e are formed upward on the bottom of the chassis 10. These dowels 10e are disposed in the vicinity of each of the guide projections 10d, preferably within 10 mm therefrom. Each of the dowels 10e are formed by press working of the chassis 10 in the direction of the thickness of the chassis 10. As stated above, since the chassis 10 is previously galvanized, each of the dowels 10e have galvanized flat surfaces. In addition, a plurality of reinforcing ribs 10f are formed on the bottom of the chassis 10, and two stopper projections 10g defining a descending position of the disc cartridge 6, and supporting wall 10h opposed to the rear rising wall 10b with a predetermined space therebetween are also formed by bending. Further, cut-outs 10i are formed at both left and right side surfaces of the chassis 10, and a tapped hole 10j is formed in the rear rising wall 10b.

Similar to the chassis 10, an iron sheet, which is a blank sheet, having galvanized upper and lower surfaces is used as a material of the slide plate 11.

As shown in FIGS. 13 to 15, the slide plate 11 is bent to form a U-shaped cross section, and an opening 11a is formed in the center of the bottom thereof. In addition, the slide plate 11 is bent at its front and rear ends to form a mounting piece 11b and a stopper 11c, respectively, so that the eject button 4 is mounted to the mounting piece 11b. Further, a plurality of guide slits 11d and one insertion slit 11f are formed in the bottom of the slide plate 11, and two cam grooves 11e are formed per one side surface of the slide plate 11, total four cam grooves 11e are formed on both side surfaces of the slide plate 11.

The slide plate 11 is placed on the chassis 10 in a state where the guide projection 10d and one stopper projection 10g are inserted into each of the guide slits 11d and the other stopper projection 10g is inserted into the insertion slit 11f, and positions of the guide slits 11d are controlled in vertical and horizontal directions by the guide projections 10d corresponding to the guide slits 11 d, so that the slide plate 11 can be shifted forward and backward of the chassis 10 (See FIG. 9). At this time, as shown in FIG. 16, the lower surface of the slide plate 11 slides on the upper surface of the dowel 10e formed on the chassis 10, and since the lower surface of the slide plate 11 and the upper surface of the dowel 10e are galvanized, the slide plate 11 can be smoothly slid with respect to the chassis 10.

Similar to the chassis 10 and slide plate 11, an iron sheet, which is a blank sheet, having galvanized upper and lower surfaces is used as a material of the holder 12.

As shown in FIGS. 17 to 19, the holder 12 is bent to form a reverse U-shaped cross section, and the holder 12 is bent at its lower ends of both side surfaces to form a supporting pieces 12a which are opposed to the upper surface of the holder 12 with a predetermined space. On the upper surface of the holder 12 is formed a swelling portion 12b slightly swelled upward, and a long hole 12c and a circular arc-shaped relief opening 12d are formed on the swelling portion 12b. A fallout preventing projection 12e is formed by bending, and a retainer hole 12f is formed in the vicinity of the swelling portion 12b. In addition, a stopper projecting piece 12g is formed at the front end of the upper surface of the holder 12. The width W1 of the stopper projecting piece 12g is set to the width W2 of the long slit 12c or less (W1≦W2). In addition, two projections 12h per one side surface of the holder 12h, total four projections 12h are formed, and a trailing piece 12i which is extending downward is formed.

As shown in FIG. 20, the holder 12 is formed into the above shape by punching out of the flat blank sheet (the galvanized iron sheet) and then bending the sheet. When punching out of the blank sheet, since the relation between the width W1 of the stopper projecting piece 12g and the width W2 of the long slit 12c is set to W1≦W2, scrap of the blank sheet can be minimized by locating the stopper projecting piece 12g formed on any holer 12 within the long slit 12c formed in another holder 12. That is, a projected portion that is left when punching out of a recessed long slit 12c is naturally abandoned as scraps. However, since the projected portions can be utilized as the stopper projecting piece 12c of another holder 12, waste portions of the blank sheet can be reduced.

Returning now to FIGS. 6 to 9, the holder 12 is inserted between both side surfaces of the slide plate 11, and a tension spring 13 is retained between the upper surface of the holder 12 and one side surface of the slide plate 11. The trailing piece 12i of the holder 12 is inserted into the cut-out 10i of the chassis 10 passing through the bottom of the slide plate 11, and the holder 12 is controlled by engagement of the trailing piece 12i with the cut-out 10i so as to be shifted only in the vertical direction with respect to the chassis 10. On the other hand, as stated above, since the slide plate 11 can be shifted forward and backward of the chassis 10, it is urged by the tension spring 13 toward the front end of the chassis 10. In addition, a rotating member 14 is disposed at the back of the slide plate 11 and holder 12. The rotating member 14 is rotatably supported by a spindle 15 embedded in the chassis 10, and urged by a torsion coil spring 16 in the counterclockwise direction of FIG. 6.

As shown in FIG. 21, the rotating member 14 is formed of a molded plastic material, and includes a cylindrical shaft 14a inserted into the spindle 15 and a pair of arms 14b, 14c projecting from a side of the shaft 14a. At the upper end of the shaft 14a are formed a pair of hook-shaped supporting walls 14d, 14e, and the torsion coil spring 16 is wound around the supporting walls 14d, 14e. At this time, since a pair of slits 14f extending toward the axial direction are formed between the supporting walls 14d, 14e, and one supporting wall 14d is formed to have thicker wall than that of the other supporting wall 14e, the wound portion of the torsion coil spring 16 can be easily inserted between both supporting walls 14d and 14e by making the thin-wall supporting wall 14e flex. In addition, at the distal end of one arm 14b is provided a shutter actuating pin 14g. The shutter actuating pin 14g penetrates through the relief opening 12d to reach upper portion of the holder 12, and one end of the torsion coil spring 16 is retained by the shutter actuating pin 14g. Further, at the distal end of the other arm 14c is formed a locking claw 14h, which can be engaged with and disengaged from the stopper 11c of the slide plate 11. The other end of the torsion coil spring 16 passes through the fallout preventing projection 12e of the holder 12, so that a bent portion 16a formed at the distal end thereof is retained by a retainer hole 12f.

Figure 22:
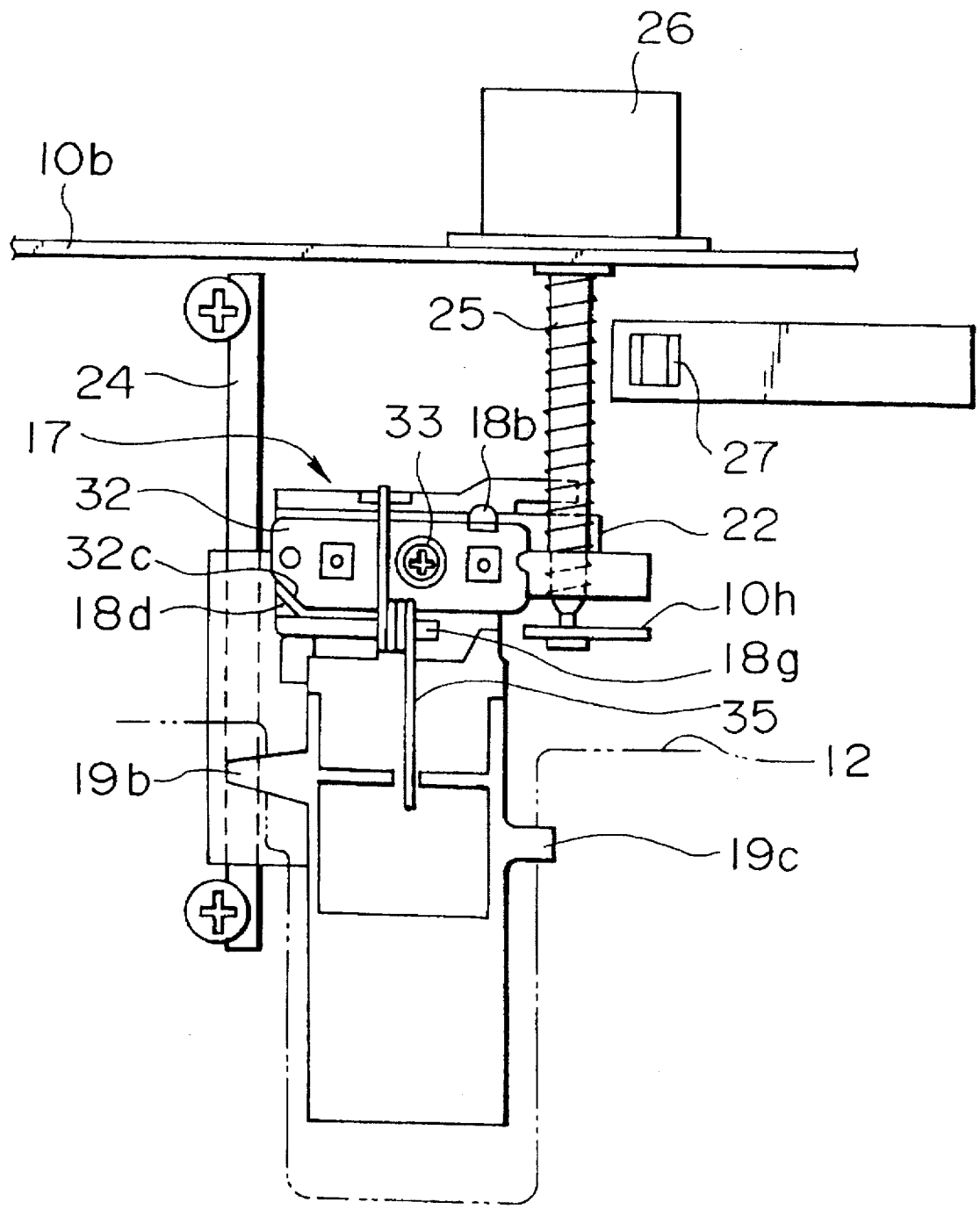
FIG. 22 is a plan view showing a head transport mechanism included in the magnetic recording/reproducing apparatus.
Figure 23:
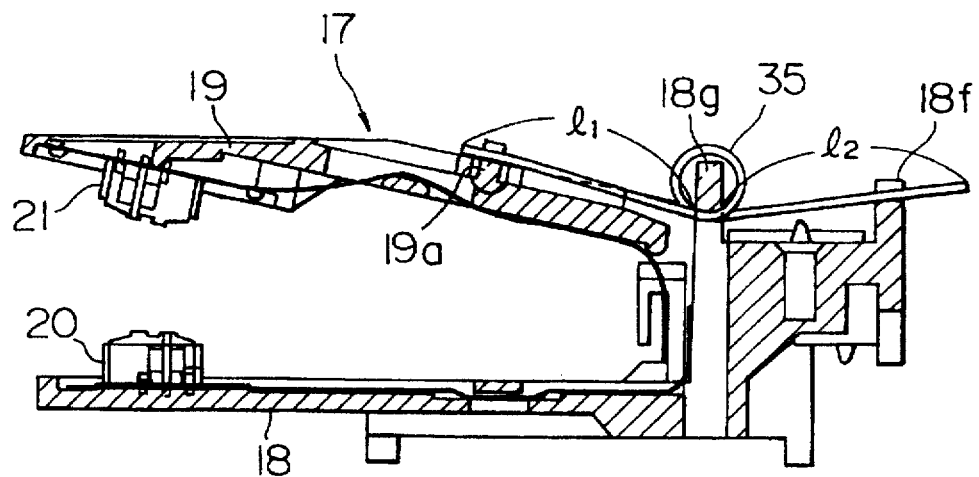
FIG. 23 is a sectional view of the head transport mechanism.
Figure 24:
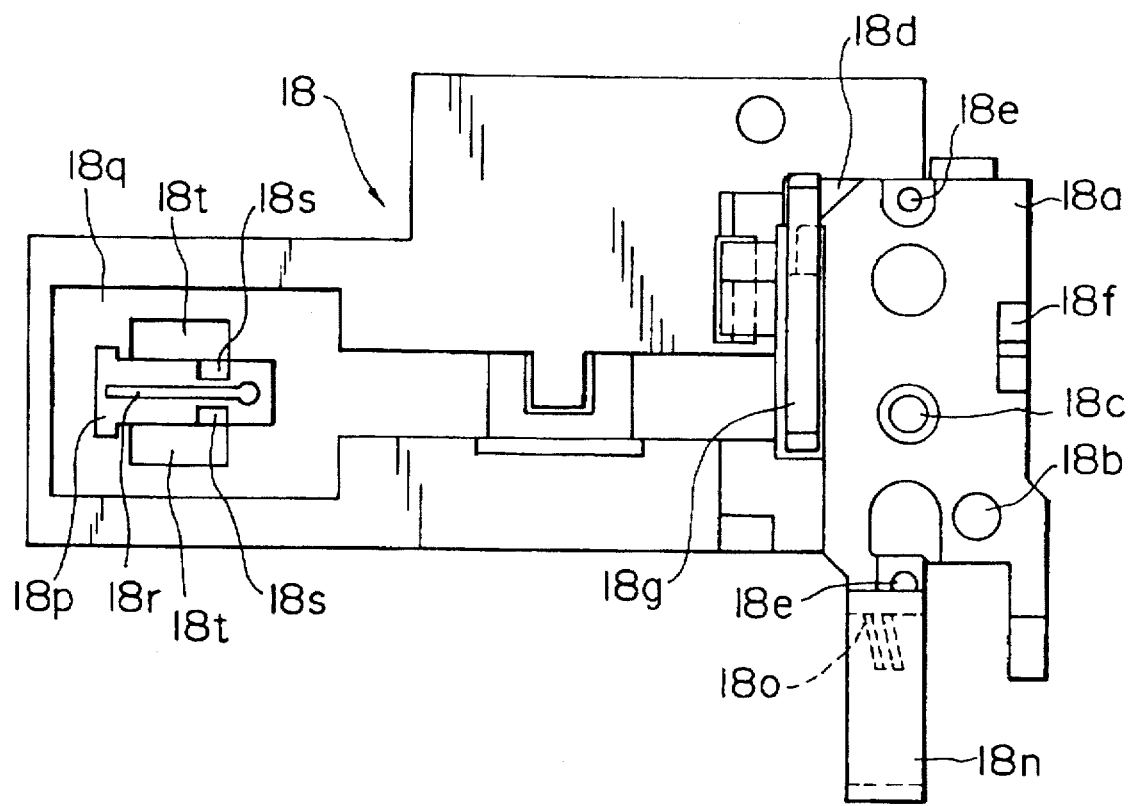
FIG. 24 is a plan view showing a carriage included in the head transport mechanism.
Figure 25:
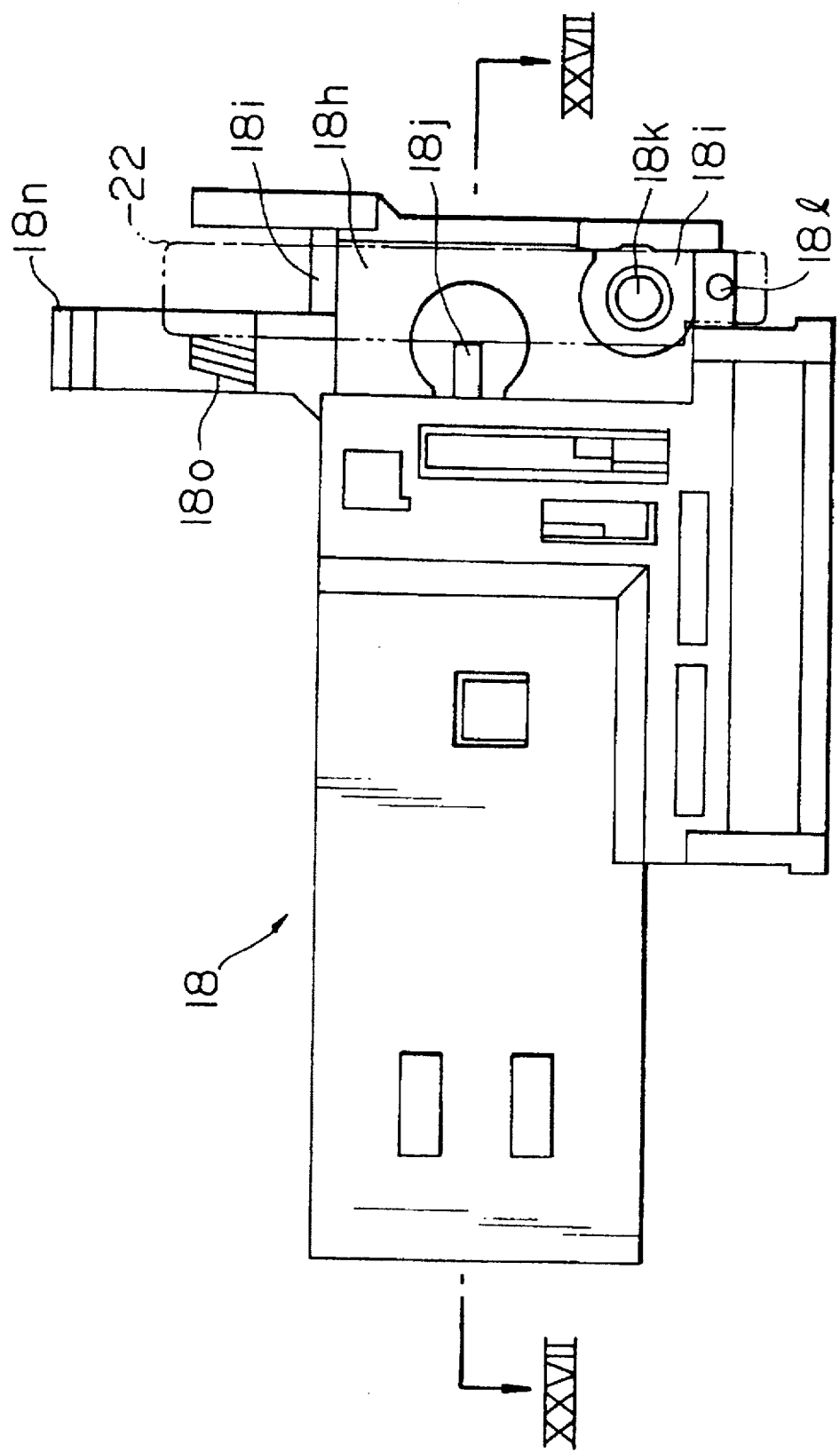
FIG. 25 is a back side view of the carriage.
Figure 26:
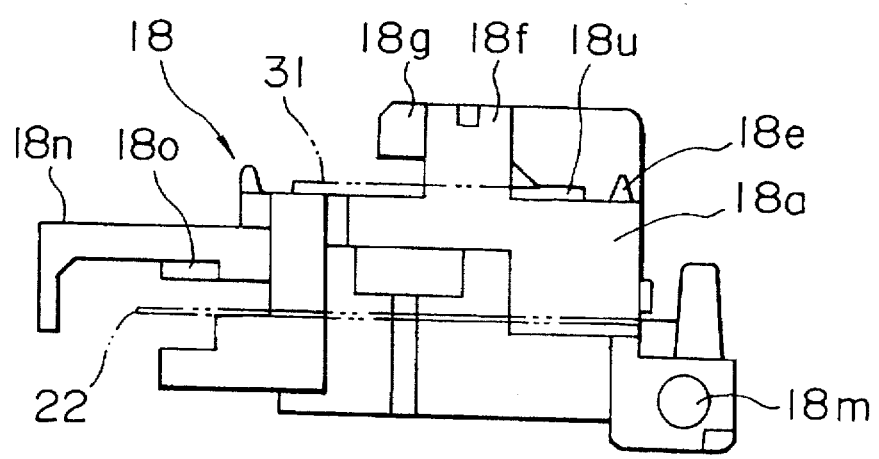
FIG. 26 is a rear elevation of the carriage.
Figure 27:
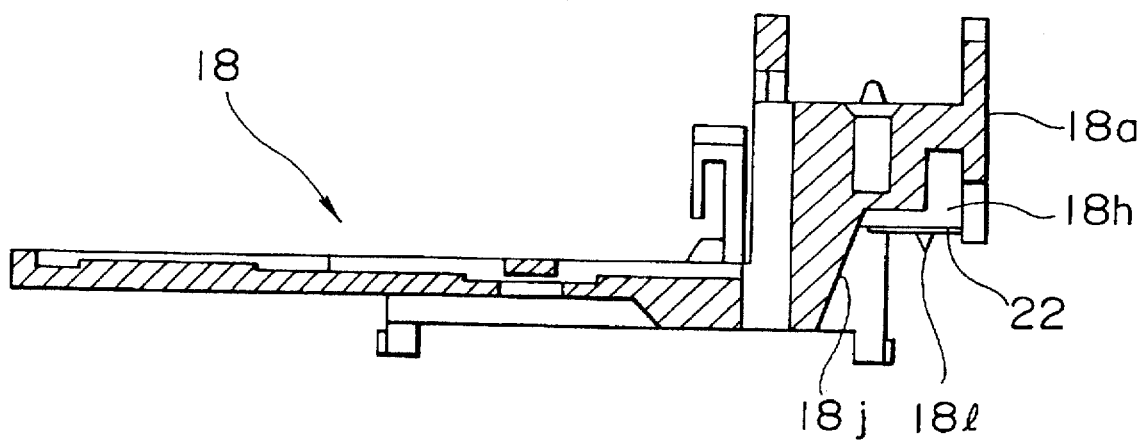
FIG. 27 is a cross sectional view taken along the line XXVII—XXVII of FIG. 25.
Figure 28:
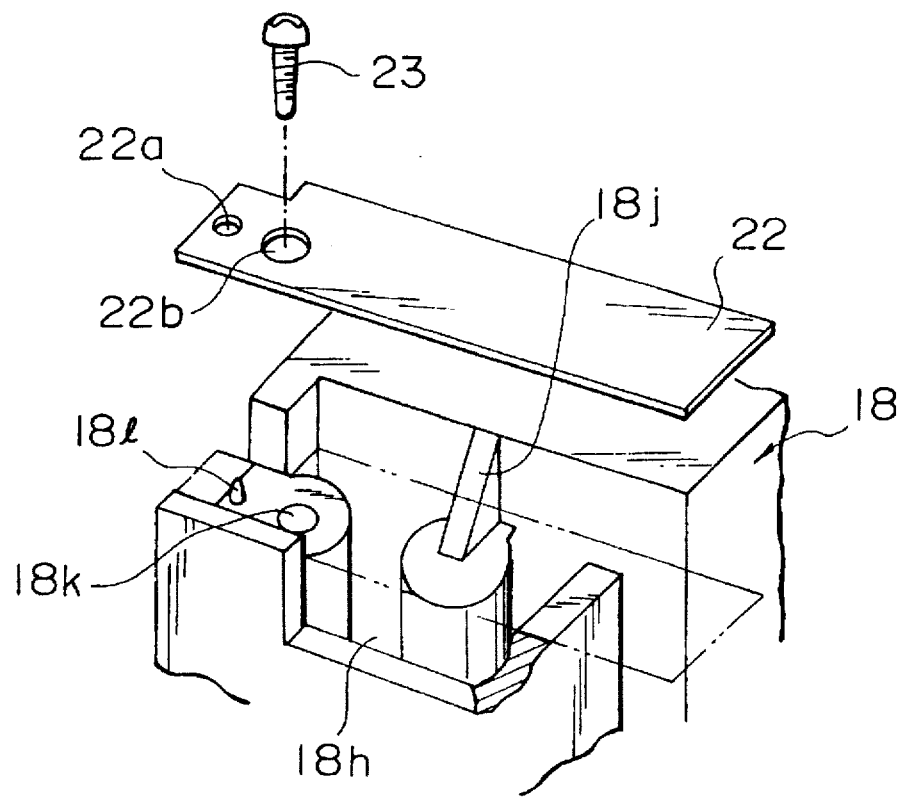
FIG. 28 illustrates a state in which a follower spring is mounted to the carriage.
Figure 29:
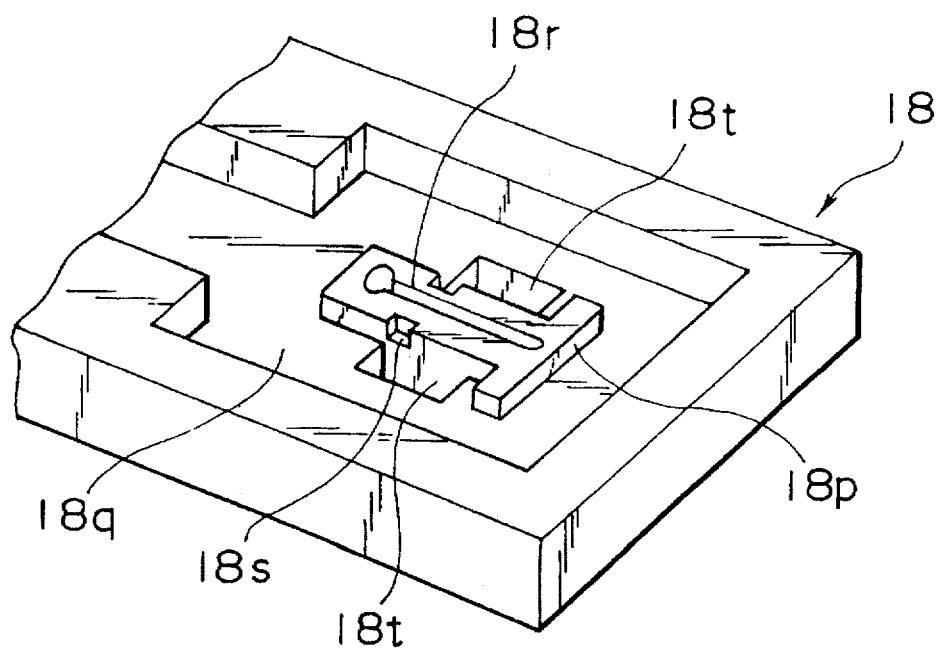
FIG. 29 is a perspective view showing a head mounting portion of the carriage.
Figure 30:
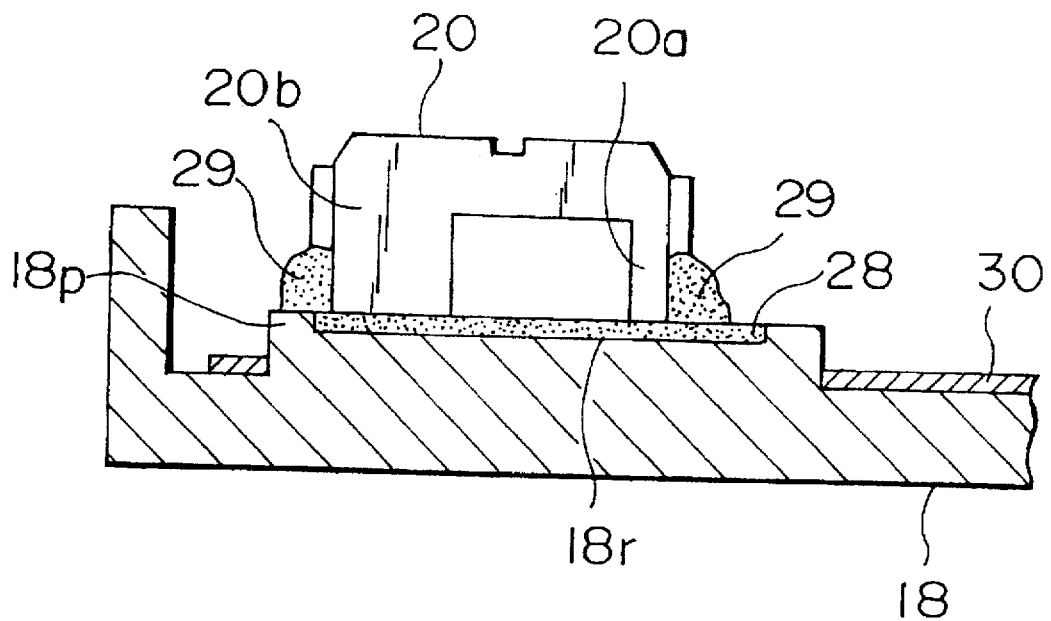
FIG. 30 is a sectional view showing a mounting state of the carriage and a lower magnetic head viewed from a longitudinal direction thereof.
Figure 31:
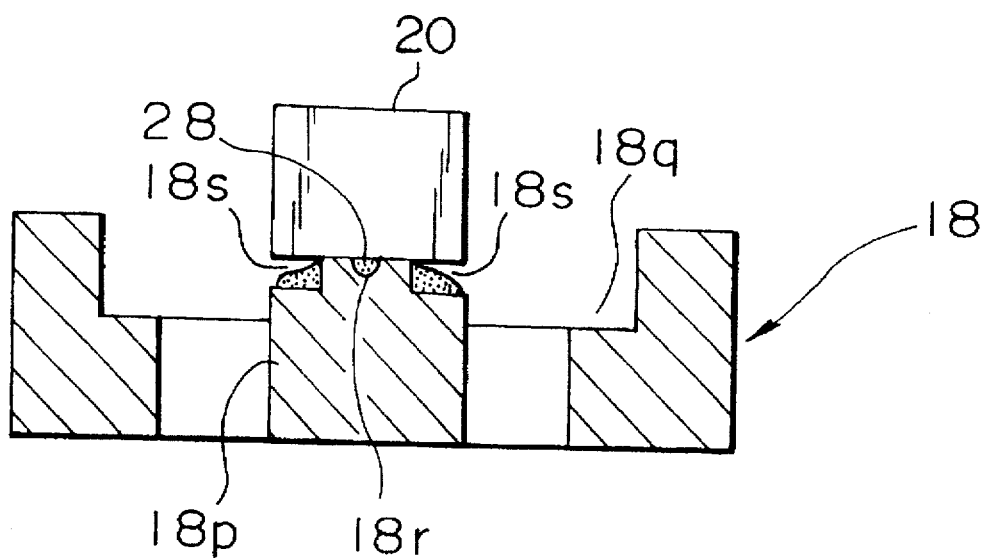
FIG. 31 is a sectional view showing a mounting state of the carriage and a lower magnetic head viewed from a lateral direction thereof.
Figure 32:
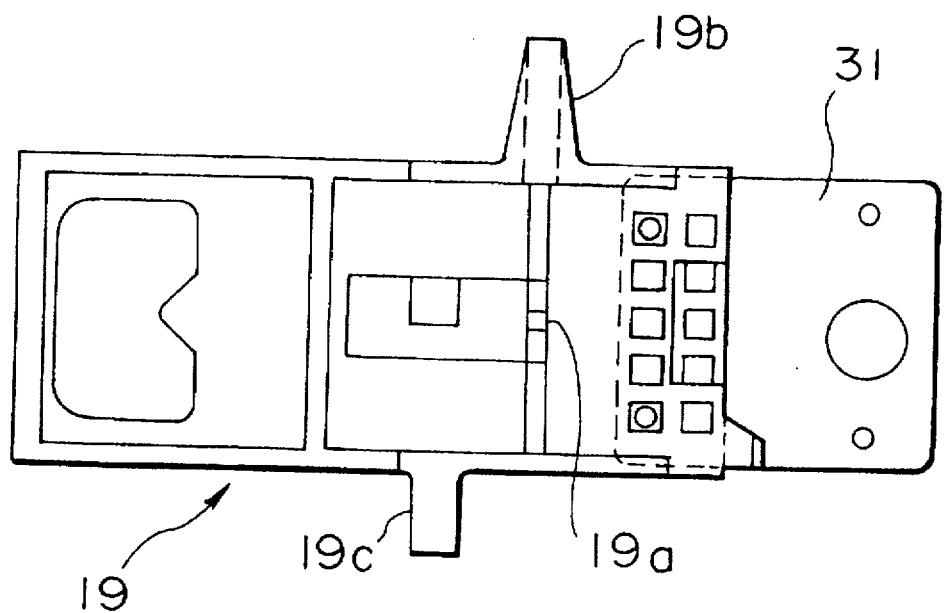
FIG. 32 is a plan view showing a hold case included in the head transport mechanism.
Figure 33:
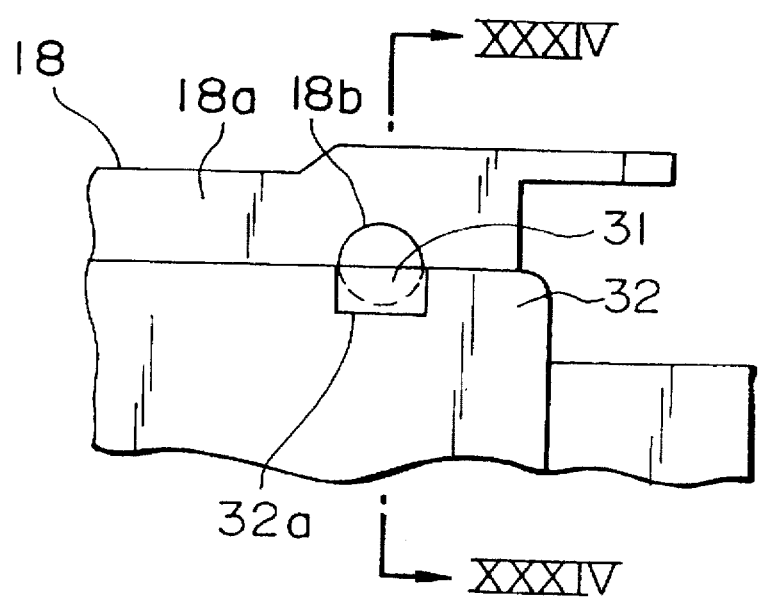
FIG. 33 is a plan view showing a main part of a mounting portion of the hold case and the carriage.
Figure 34:
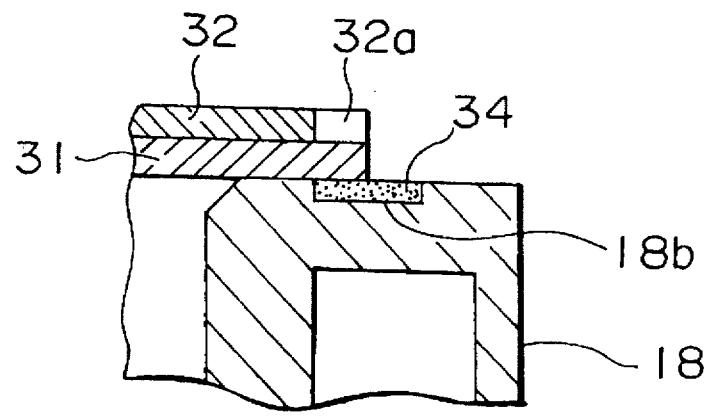
FIG. 34 is a cross sectional view of FIG. 33 taken along the line XXXIV—XXXIV.

FIG. 22 is a plan view showing a head transport mechanism; FIG. 23 is a sectional view of the head transport mechanism; FIG. 24 is a plan view showing a carriage included in the head transport mechanism; FIG. 25 is a back side view of the carriage; FIG. 26 is a rear elevation of the carriage; FIG. 27 is a cross sectional view taken along the line XXVII—XXVII of FIG. 25; FIG. 28 illustrates a state where a follower spring is mounted to the carriage; FIG. 29 is a perspective view showing a head mounting portion of the carriage; FIG. 30 is a sectional view showing a mounting state of the carriage and a lower magnetic head viewed from a longitudinal direction thereof; FIG. 31 is a sectional view showing a mounting state of the carriage and a lower magnetic head viewed from a lateral direction thereof; FIG. 32 is a plan view showing a hold case included in the head transport mechanism; FIG. 33 is a plan view showing a main part of a mounting portion of the hold case and the carriage; and FIG. 34 is a cross sectional view of FIG. 33 taken along the line XXXIV—XXXIV.

At the rear portion of the chassis 10 is disposed a head transport mechanism 17, which is comprised of a carriage 18 and a hold case 19 hinge-coupled above the carriage 18, as shown in FIGS. 22 and 23. The carriage 18 and hold case 19 are formed of a plastic material, and a lower magnetic head 20 and an upper magnetic head 21 are fixed to the upper surface and lower surface of the carriage, respectively.

As shown in FIGS. 24 to 27, at the rear portion of the carriage 18 are formed a stepped connect portion 18a, a circular groove 18b, a tapped hole 18c, a control protrusion 18d, a pair of positioning pins 18e, a spring bearing 18f, and an L-shaped spring support portion 18g and so forth. In addition, at the back of the connect portion 18a are formed a concave portion 18h, the lower surface of which is opened, a pair of support portions 18i positioned on opposite sides of the recessed portion 18h and a guide portion 18j sloped toward the recessed portion 18h, and a tapped hole 18k and a positioning pin 18l are provided on one of the support portions 18i. The lower surfaces of both support portions 18i are flush with each other, so that a follower spring 22 shown by a chain double-dashed line is fixed between the support portions 18i.

When mounting the follower spring 22, the follower spring 22 is first dropped onto the support portions 18i from the back of the connect portion 18a with the carriage 18 reversed, and the positioning pin 18l is inserted into a positioning hole 22a of the follower spring 22. Thereafter, a screw 23 is screwed into the tapped hole 18k penetrating through an aperture 22b and the screw 23 is tightened, whereby the follower spring 22 is fixed to the back surface of the connect portion 18a of the carriage 18. At this time, since the guide portion 18j is formed at the opening end of the recessed portion 18h, the follower spring 22 is securely dropped onto the support portions 18i along the guide portion 18j so that the follower spring can be mounted easily.

Returning to FIGS. 22 to 27, a through hole 18m is formed in one side of the carriage 18. The carriage 18 is inserted through a guide shaft 24 fixed to the chassis 10, whereby the carriage is guided backward and forward of the chassis 10. In addition, on the other side of the carriage 18 is formed an L-shaped arm 18n, which passes through the upper portion of a screw shaft 25 to reach a detecting section 27 which is comprised of a photo-interrupter provided on the chassis 10. A projected portion 18o is formed at the back surface of the L-shaped arm 18n, and the projected portion 18o is in thread engagement with the screw shaft 25 by a resilient force of the follower spring 22. The screw shaft 25 is an axis of rotation of a stepping motor 26 mounted to a rear rising wall 10b of the chassis 10, and the distal end thereof is supported by the supporting wall 10h of the chassis 10. Therefore, when the screw shaft 25 is rotated using the stepping motor 26 as a drive source, the rotation of the screw shaft 25 is transmitted through the projected portion 18o to the carriage 18 so that the carriage 18 is shifted forward and backward of the chassis 10, i.e., in the radial direction of the magnetic disc 8. At this time, when the distal end of the L-shaped arm 18 moves across the detecting section 27, a zero track signal is outputted.

As shown in FIGS. 29 to 31, a mounting base 18p is formed in the center of the front end of the carriage 18, and the circumference of the mounting base 18p is a depressed portion 18q. In the upper surface of the mounting base 18p are formed an adhesive filling groove 18r extending in the direction of the length of the carriage 18, and relief grooves 18s positioned on opposite sides of the adhesive filling groove 18r. In both sides of the mounting base 18p are formed through holes 18t. The lower magnetic head 20 is placed on the mounting base 18p, and the lower magnetic head 20 is fixed to the mounting base 18p by means of adhesive 28 filled in the adhesive filling groove 18r. At this time, a circular large diameter portion formed on one end of the adhesive filling groove 18r is located outward than the lower magnetic head 20, and the adhesive 28 injected into the groove 18r from the large diameter portion is securely filled between the lower magnetic head 20 and the mounting base 18p through the adhesive filling groove 18r. In addition, since the adhesive filling groove 18r is extending along the center of the lower surface of the lower magnetic head 20, the lower magnetic head 20 is bonded and fixed to the mounting base 18p in good balance. Further, the lower magnetic head has a thin-wall core portion 20a and a thick-wall core portion 20b. The thin-wall core portion 20a having rigidity lower than that of the thick-wall core portion 20b is positioned on both relief grooves 18s across the adhesive filling groove 18r so that an excessive adhesive 28 flown out of the adhesive filling groove 18r through the lower surface of the lower magnetic head 20 is collected within these relief grooves 18s. As a consequence, the thin-wall core portion 20a is prevented from being broken by hardening of the adhesive 28.

When adhesive 29, such as a UV curable resin is applied as needed around the lower magnetic head 20 after fixing the lower magnetic head 20 to the mounting base 18p by means of the adhesive 28, the lower magnetic head 20 can be fixed to the mounting base 18p more securely (See FIG. 30). The lower magnetic head 20 bonded and fixed to the mounting base 18p in this way is connected to an FPC (flexible printed circuit) 30, and the FPC is guided to a printed circuit board 37, which will be described later, through the depressed portion 18q.

As shown in FIG. 32, a spring bearing 19a is formed on the upper surface of the hold case 19, and a first and second support arms 19b and 19c are projected, respectively, from both sides of the hold case 19. The lower surface of the first support arm 19b is located at a position lower than the lower surface of the second support arm 19c. In this embodiment, the distal end of the first support arm 19b is formed into an L-shape downward, whereby the distal end of the first support arm 19b is projected downward than the second support arm 19c. In addition, at the rear end of the hold case 19 is provided a leaf hinge spring 31 formed by an elastic metal plate, and the hold case 19 and the leaf hinge spring 31 are integrated by an out sert molding. Further, the upper magnetic head 21 is fixed to the front end of the hold case 19 through a gimbal spring. The upper magnetic head 21 is also guided to the printed circuit board 37, which will be described later, through the FPC (not shown).

The hold case 19 constructed as described above is, as shown in FIGS. 22 and 23, hinge-coupled on the connect portion 18a by overlaying the leaf hinge spring 31 and the mounting plate 32 to be placed on the connect portion 18a of the carriage 18, and then screwing a set screw 33 into the tapped hole 18c of the connect portion 18a from above. At this time, as shown in FIG. 26, one side edge of the leaf hinge spring 31 is inserted into a notch 18u formed at the base portion of the spring support portion 18g to be placed on the connect portion 18a, whereby the one side edge of the leaf hinge spring 31 is pressed by the spring support portion 18g. In this state, the hold case 19 is slightly rotated against a tightening force of the set screw 33 to adjust the alignment of the upper and lower magnetic heads 20 and 21, and then the adhesive 34 is filled into the circular groove 18b of the carriage 18, whereby the leaf hinge spring 31 is temporarily fixed to the connect portion 18a. In this case, as shown in FIGS. 33 and 34, since the leaf hinge spring 31 is placed on the connect portion 18a in such a manner that it covers a substantially half portion of the circular groove 18b, the adhesive 34 can be easily filled between the carriage 18 and the leaf hinge spring 31 from the exposed portion of the circular groove 18b. In addition, since a cut-out 32a is formed in the mounting plate 32 of the leaf hinge spring 31, an excessive adhesive 34 is collected within the cut-out 32a, thus preventing the undesirable extrusion of the adhesive 34. After completion of the temporary fixing, the set screw 33 is strongly tightened for a real fixing. In this case, however, since the leaf hinge spring 31 is temporarily fixed to the connect portion 18a by means of the adhesive 34, the alignment of the upper and lower magnetic heads 20 and 21 is maintained.

The mounting plate 32 is formed by press-punching out of a metal flat plate, and burrs are generated on one surface of the mounting plate 32 at the time of the press-punching. The heights of the burrs are not uniform. If the mounting plate 32 is placed on the connect portion 18a of the carriage 18 with the burr-generated surface thereof reversed, the tightening force of the set screw 33 does not act on the leaf hinge spring 31 uniformly. Thus, in this embodiment, as shown in FIG. 22, a gullet 32c is formed at one corner of the mounting plate 32, and the control protrusion 18d of the carriage 18 is located within the gullet 32c, thereby imparting a direction to the mounting plate 32. Therefore, in condition where the mounting plate 32 is placed on the connect portion 18a of the carriage 18, the burrs are always directed upward, so that the mounting plate 32 can't be incorporated into the carriage 18 with its reversed condition.

Returning again to FIG. 22, a wound portion of a load spring 35 is inserted into the spring support portion 18g of the carriage 18, and the both free ends of the load spring 35 are retained by the spring bearings 18f, 19a, respectively, whereby the hold case 19 is elastically urged toward the carriage 18. The load spring 35 is formed by a torsion coil spring, and the lengths $l_1$, $l_2$ between the wound portion and both free ends thereof are set to substantially the same lengths. For this reason, at the time of incorporation of the load spring 35, it becomes unnecessary to care about the direction thereof, thus improving workability. In addition, the hold case 19 is located within the long slit 12c of the holder 12, the first support arm 19b is brought into abutment with the swelling portion 12b of the holder 12 by a resilient force of the load spring 35, so that a predetermined clearance is secured between the second support arm 19c and the swelling portion 12b. At this time, since the second support arm 19c is formed at a position far away from the leaf hinge spring 31 with respect to the first support arm 19b, the thickness of the second support arm 19c is increased as thick as possible with a condition that the clearance required between the second support arm 19c and the swelling portion 12 is secured. Further, the first support arm 19b is brought into abutment with the swelling portion 12b of the holder 12 at a position substantially just above the guide shaft 24, and the head transport mechanism 17 is elastically supported by the follower spring 22 at a distant position from the guide shaft 24. Therefore, even if a follower spring of a small resilience is used, floating of the head transfer mechanism 17 including the carriage 18 can be prevented.

Figure 35:
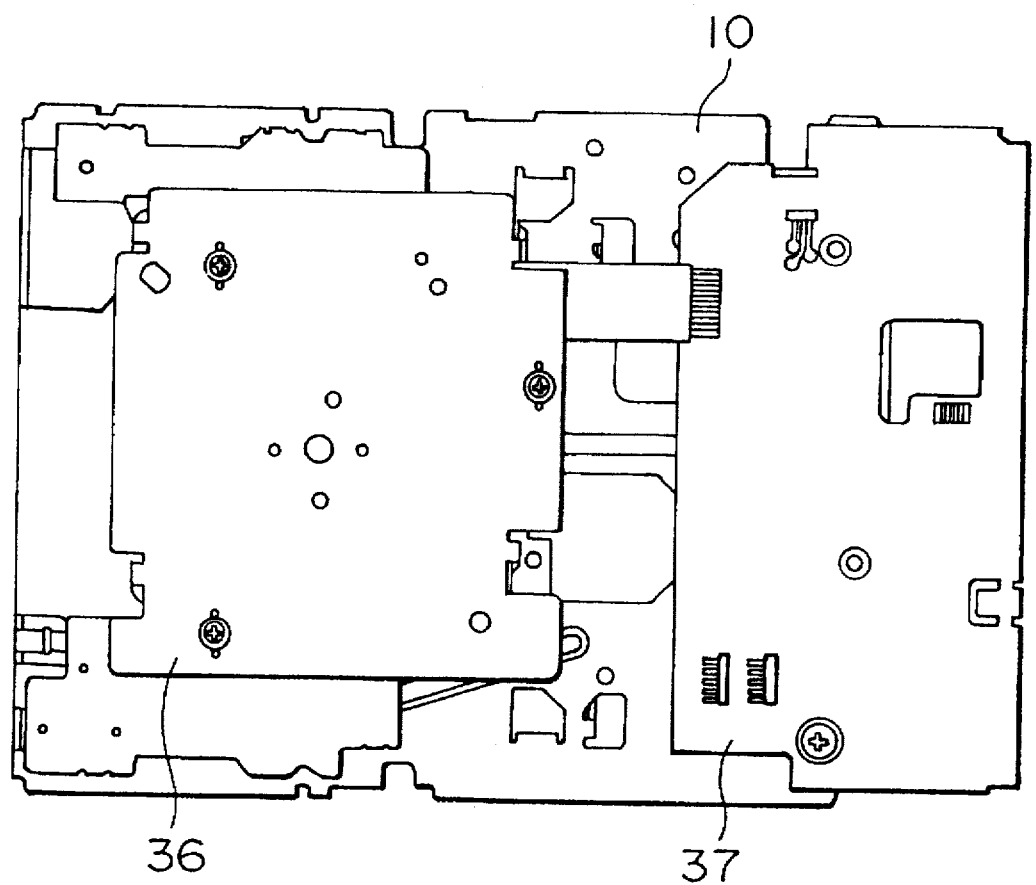
FIG. 35 illustrates the chassis 10 viewed from the back side thereof.

FIG. 35 illustrates the chassis 10 viewed from the back side thereof. As shown in FIG. 35, a sub-chassis 36 and the printed circuit board 37 are fixed to the lower surface of the chassis 10. A spindle motor 38 is mounted on the sub-chassis 36 (See FIG. 9), and the spindle motor 38 is electrically connected to the printed circuit board 37 through a controlling base board and the FPC. On the printed circuit board 37 are mounted circuit device including drive circuit devices, such as the stepping motor 27 and the spindle motor 38, and two connectors 39, 40 are mounted to the upper rear end portion thereof, as shown in FIG. 9. The connectors 39, 40 are male connectors having a plurality of connecting pins 39a, 40a, respectively, and a female connector 41 of the external equipment shown by a chain double-dashed line is inserted into the connectors 39, 40, so that the magnetic recording/reproducing apparatus is connected to the external equipment.

Figure 36:
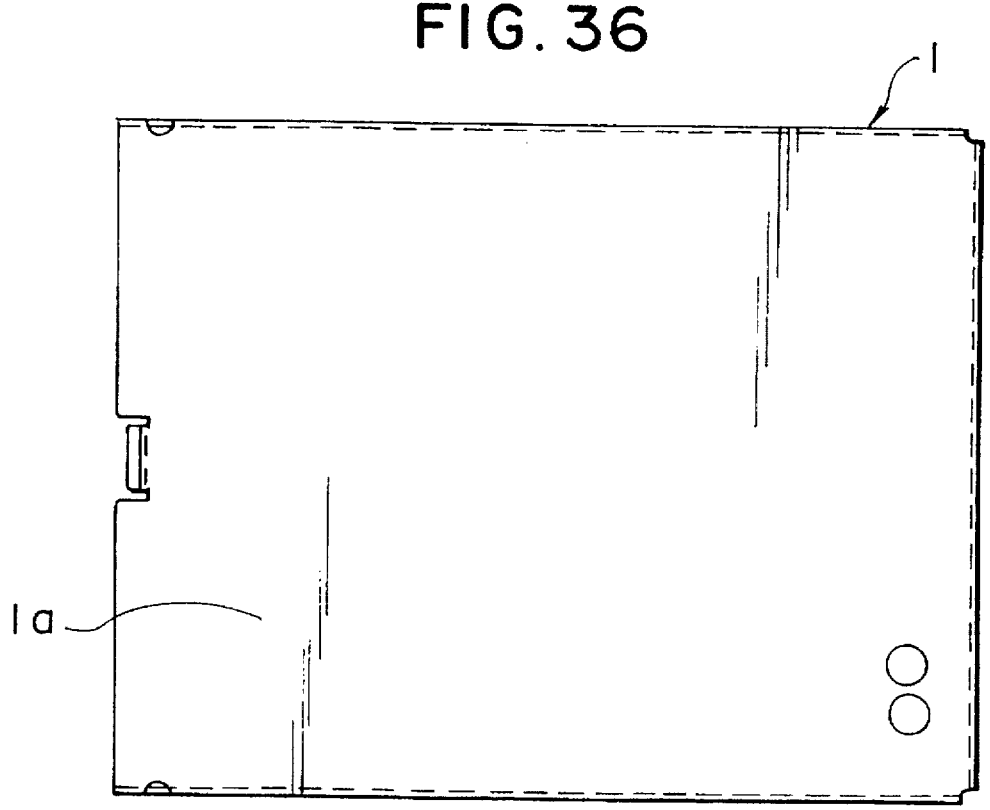
FIG. 36 is a plan view showing an upper cover included in the magnetic recording/reproducing apparatus.
Figure 37:
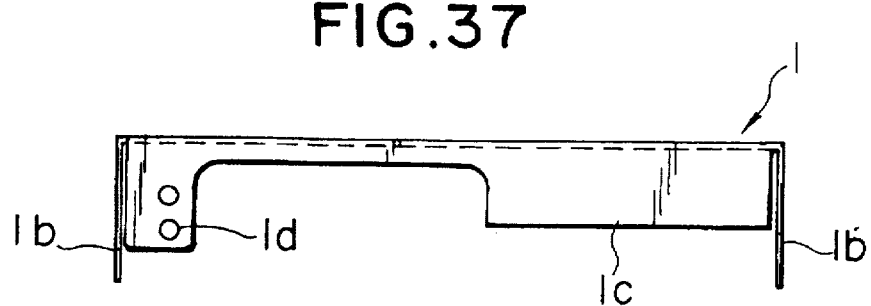
FIG. 37 is a rear elevation of the upper cover.
Figure 38:
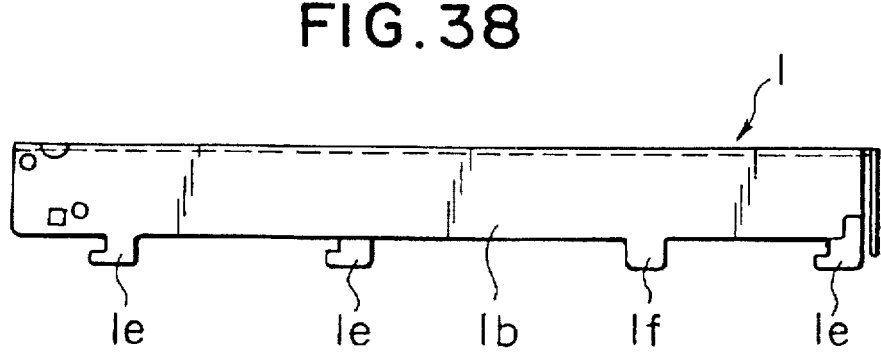
FIG. 38 is a side view of the upper cover.
Figure 39:
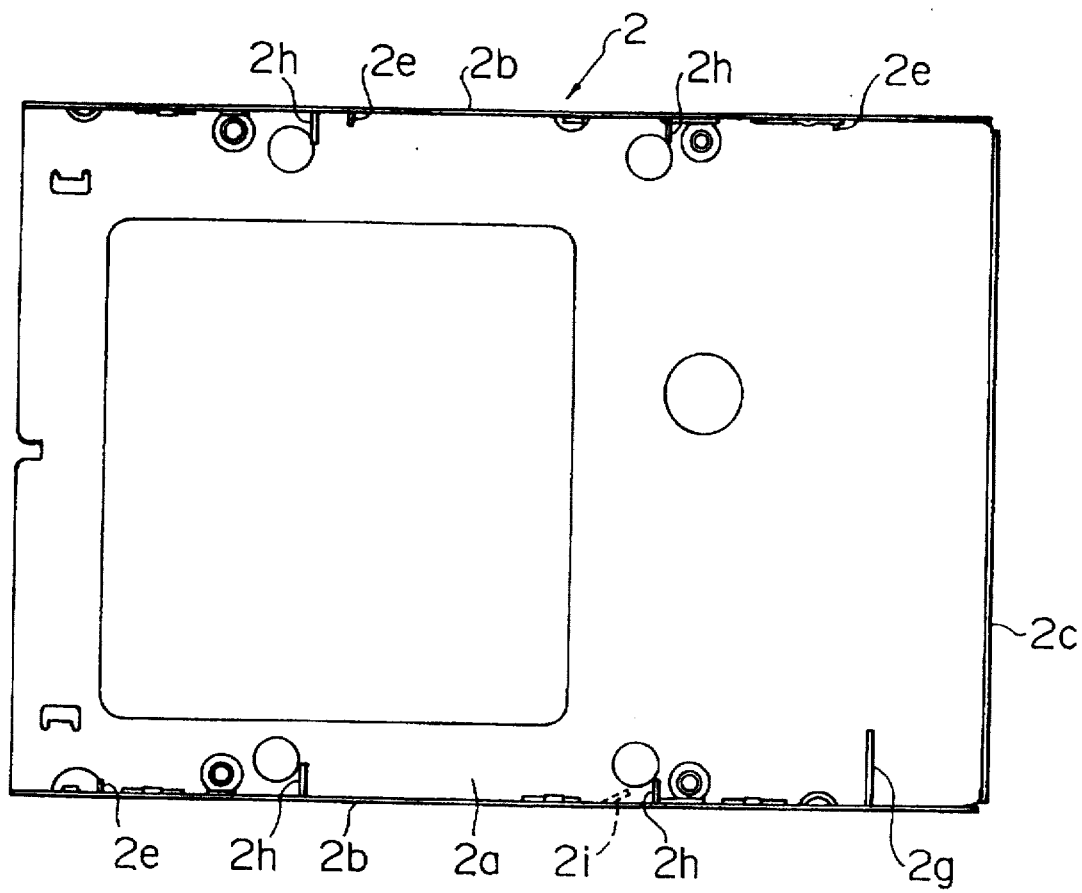
FIG. 39 is a plan view of the lower cover included in the magnetic recording/reproducing apparatus.
Figure 40:
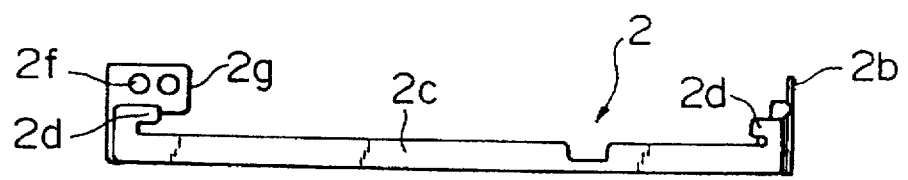
FIG. 40 is a rear elevation of the lower cover.

FIG. 36 is a plan view of the upper cover; FIG. 37 is a rear elevation of the upper cover; FIG. 38 is a side view of the upper cover; FIG. 39 is a plan view of the lower cover; FIG. 40 is a rear elevation of the lower cover; and FIG. 41 is a side view of the lower cover.

As shown in FIGS. 36 to 38, the upper cover 1 includes a flat top surface 1a, a pair of side surfaces 1b trailing form both side edges of the top surface 1a, and a rear surface 1c trailing from the rear end of the top surface 1a. The side surfaces 1b and rear surface 1c are bent perpendicular to the to the top surface 1a. An aperture 1d is formed in the rear surface 1c, two L-shaped leg pieces 1e are formed at the lower end of one of the side surfaces 1b, and one L-shaped leg piece 1e and one rectangle trailing piece 1f are formed at the other lower end of the side surface 1b. The positions of the leg pieces 1e and trailing piece 1f are shifted forward and backward of the upper cover 1 one to the other.

Therefore, when the upper cover 1 is multiply punched out of the metal flat blank sheet, by locating the leg pieces 1e and trailing piece 1f formed on any upper cover 1 located between the both leg pieces 1e, or between the leg pieces 1e and the trailing piece 1f formed on another upper cover 1, scraps generated from the blank sheet can be minimized.

Figure 41:
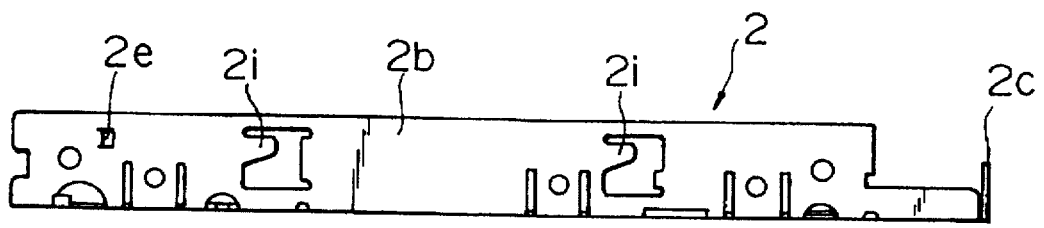
FIG. 41 is a side view of the lower cover.

As shown in FIGS. 39 to 41, the lower cover 2 includes a flat plate-like bottom 2a, a pair of side surfaces 2b rising from both edges of the bottom 2a, and a rear surface 2c rising from the rear end of the bottom 2a. The side surfaces 2b and rear surface 2c are bent perpendicular to the bottom 2a. The height of the rear surface 2c is set sufficiently lower than those of the side surfaces 2b, and a pair of regulation walls 2d are projected on the upper end of the rear surface 2c. Two locking pieces 2e are formed on one side surface 2b, and one locking piece 2e and one tab having an aperture 2f are formed on the other side surface 2c. These locking pieces 2e are bent toward the inside of the side surfaces 2b along a vertical line. In addition, two pairs of support pieces 2h and stop pieces 2i are located opposite sides of an opening per one side, total four pairs of the support pieces 2h and stop pieces 2i are formed on both left and right side surfaces 2b. The support pieces 2h and stop pieces 2i are vertically shifted, and the lower ends of the stop pieces 2i are inclined upward. Although the stop pieces 2i are in a pressed-out condition, the support pieces 2h are bent substantially at the right angle toward the inside of the side surfaces 2b along the vertical line after they are pressed out.

Figure 42:
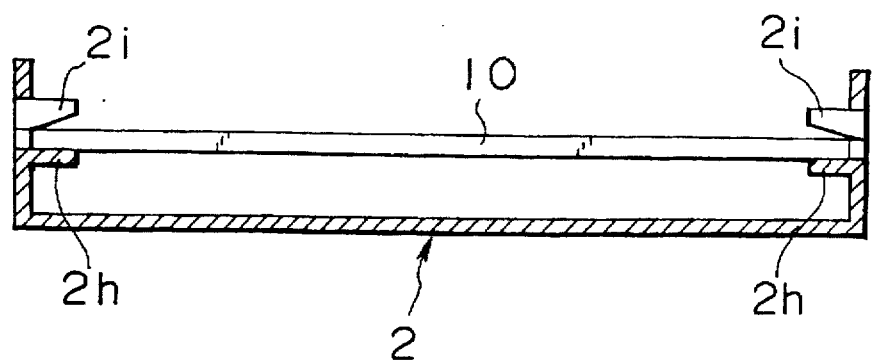
FIG. 42 illustrates a fixing relation between the lower cover and the chassis.

After fixing the main mechanism body to the lower cover 2 constructed as described above, by putting the upper cover 1 on the lower cover 2 so as to join and integrate these upper and lower covers 1 and 2 to each other, the case of the magnetic recording/reproducing apparatus is formed as stated above. In this case, as shown in FIG. 42, the chassis 10 of the assembled main mechanism body is inserted inside of the lower cover 2 so as to be placed on each of the support pieces 2h, and then each of the stop pieces 2i are bent substantially at right angle toward the inside of the side surfaces 2b, so that the chassis 10 is clamped by each pair of the stop pieces 2i and support pieces 2h. This is illustrated in FIGS. 6 to 8. Apparently from these drawings, the regulation walls 2d of the lower cover 2 are located aside the connectors 39 and 40 mounted on the printed circuit board 37. Therefore, when the female connector 41 of the external equipment is inserted in to the connectors 39 and 40, the lateral shifting of the female connector 41 is regulated by the regulation walls 2d, so that the female connector 41 can be easily inserted into the connectors 39 and 40.

Figure 43A:
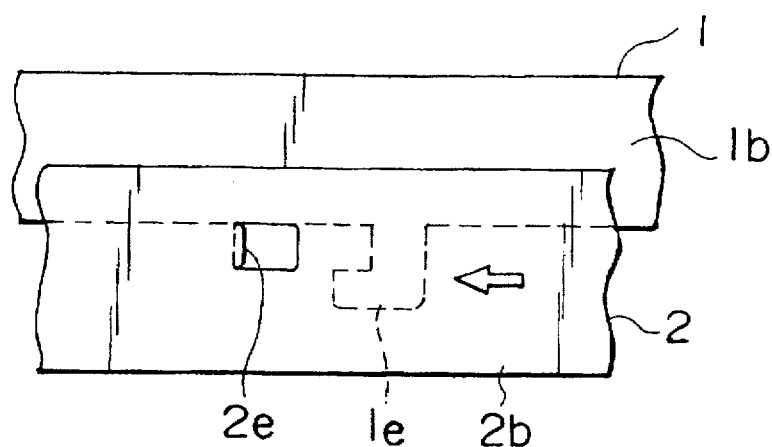
FIGS. 43A and 43B illustrate an assembly step of the upper cover and the lower cover.
Figure 43B:
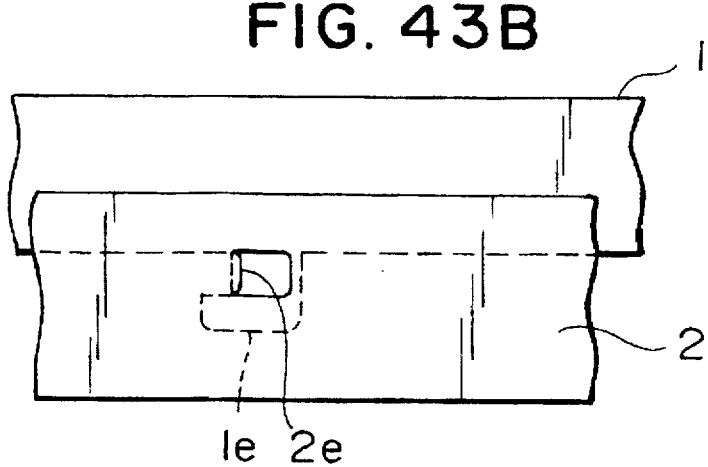
Figure 44:
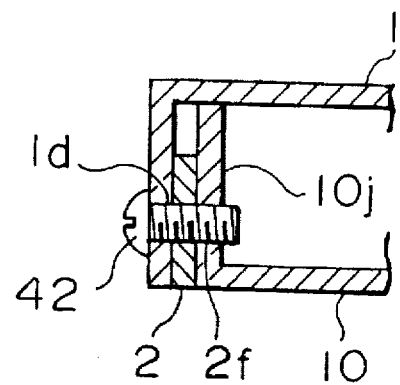
FIG. 44 is a sectional view showing a main part of a fixing portion of the upper cover, lower cover and chassis.

Then, when both side surfaces 1b of the upper cover 1 are inserted inside of both side surfaces 2b of the lower cover 2 to press the upper cover 1 in the direction of the rear end of the lower cover 2 (the direction shown by an arrow), as shown in FIG. 43A, the locking pieces 2e of the lower cover 2 enters into spaces formed between the lower ends of the side surfaces 1b of the upper cover 1 and the distal ends of the leg pieces 2e, as shown in FIG. 43B, so that the upper cover 1 is coupled to the lower cover 2. In this case, since the leg pieces 1e and the locking pieces 2e locked therewith are punched out of a blank sheet, high dimensional accuracy of the leg pieces 1e and the locking pieces 2e is secured. Therefore, the leg pieces 1e are securely locked with the corresponding locking pieces 2e regardless of the bending angles of the locking pieces 2e. In addition, since openings which are formed during punching of the locking pieces 2e are closed by the leg pieces 1e, dust proofing and magnetic shielding can be achieved. Thereafter, when a screw 42 is screwed into the tapped hole 10j of the chassis 10 piercing through the upper cover 1 and apertures 1d and 2f of the lower cover 2, as shown in FIG. 44, the main mechanism body including the chassis 10, the lower cover 2 and the upper cover 1 are joined and integrated one to the other.

The magnetic recording/reproducing apparatus according to this embodiment is constructed as described above. The operation of the magnetic recording/reproducing apparatus will now be described.

Figure 45:
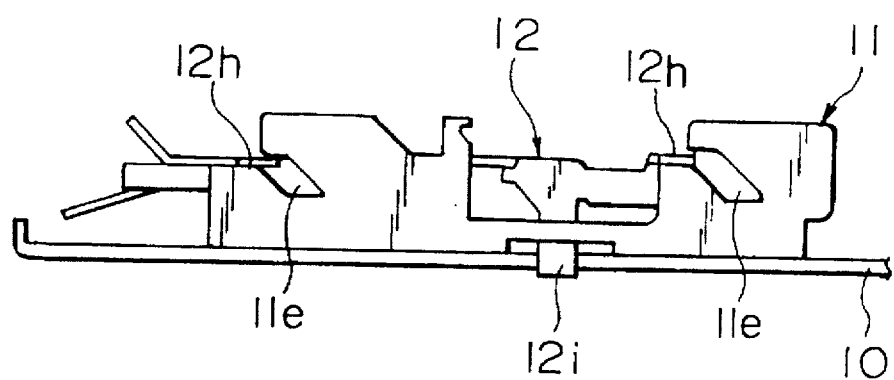
FIG. 45 illustrates a relation between the holder and the slide plate before loading of the disc cartridge.
Figure 46:
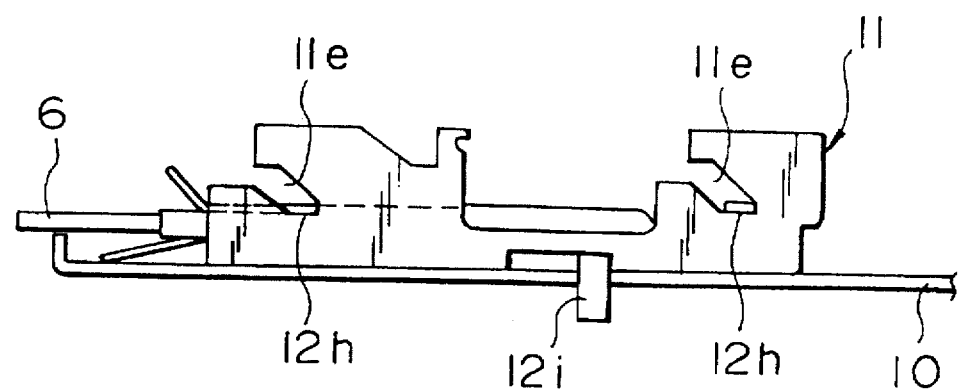
FIG. 46 illustrates a relation between the holder and the slide plate when the disc cartridge is loaded.

Under the state where the disc cartridge 6 is not loaded, the rotating member 14 is elastically urged by the torsion coil spring 16 and located at the position of FIG. 6. The locking claw 14h of the rotating member 14 is retained by the stopper 11c of the slide plate 11, whereby the slide plate 11 is maintained at the backward position thereof. In this case, as shown in FIG. 45, each of the projections 12h are locked with the upper end of each of the cam grooves 11e, whereby the holder 12 is maintained at a raised position.

When the disc cartridge 6 is inserted into the apparatus from the insertion opening 3a of the front panel 3, the leaf 5 is hinged due to the disc cartridge 6. An excessive hinging motion of the leaf 5 is regulated by an abutment of the leaf 5 with the stopper projection 12g of the holder. When the disc cartridge 6 is further inserted until it strikes against the shutter actuating pin 14g of the rotating member 14 passing through a space between the upper surface of the holder 12 and the supporting piece 12a, the bent portion 16a of the torsion coil spring 16 are released outside by a tapered wrong insertion preventive portion 7a in the course of the insertion. When the disc cartridge 6 is wrong-inserted by being turned upside down, the front end of the cartridge case 7 is brought into abutment with the bent portion 16a so that further insertion of the disc cartridge 6 can be prevented.

Figure 47:
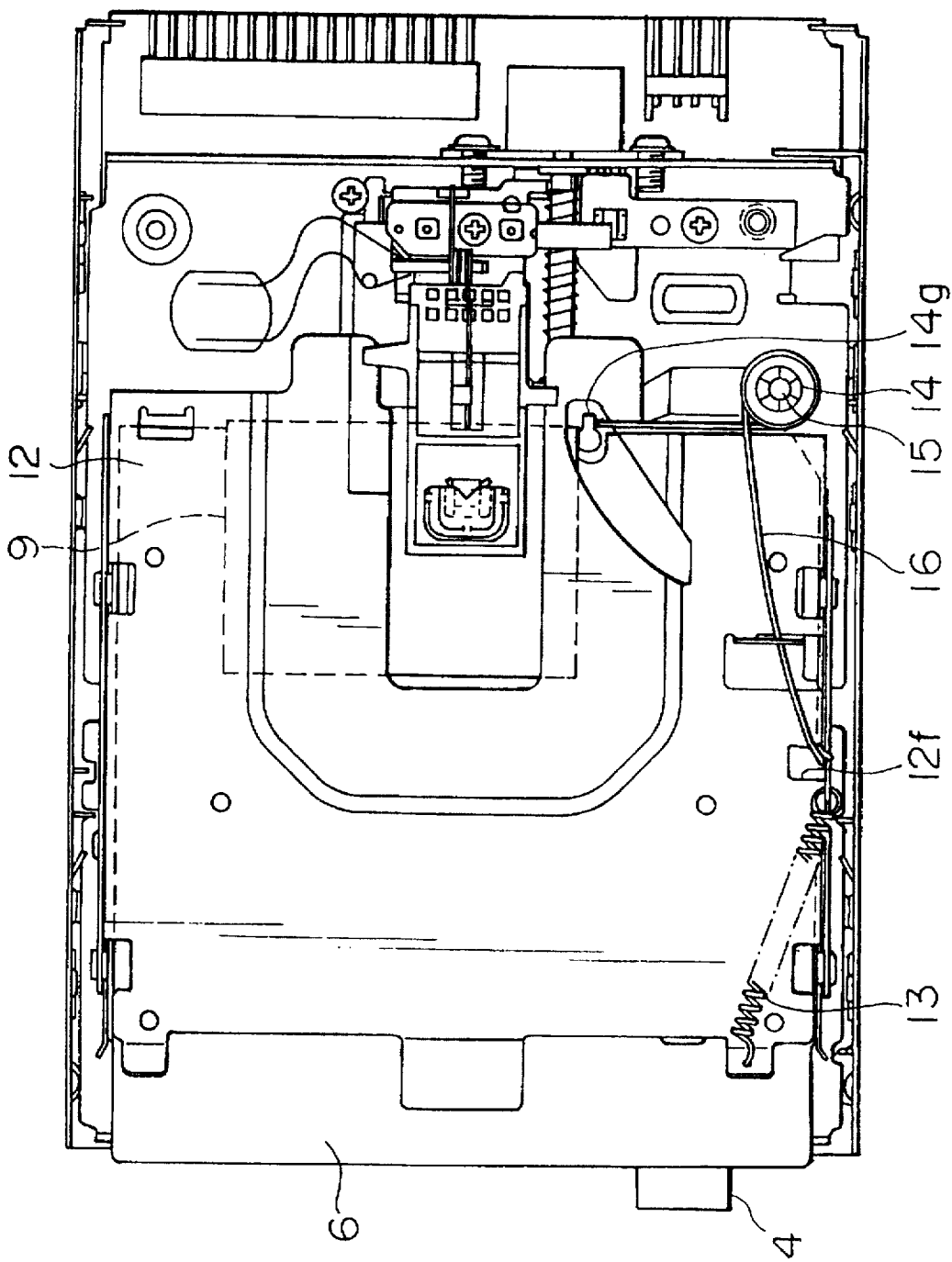
FIG. 47 is a plan view showing a state where the disc cartridge is loaded in the magnetic recording/reproducing apparatus shown in FIG. 6.

Further, when the disc cartridge 6 is inserted into the apparatus, the rotating member 14 rotates in a clockwise direction of FIG. 6 against a resilient force of the torsion coil spring 16, as shown in FIG. 47, and the distal end of the disc cartridge 6 enters between the carriage 18 and the hold case 19 of the head transport mechanism 17. Since the shutter actuating pin 14g rotates within the aperture 12d of the holder 12 in accordance with the rotation of the rotating member 14, the shutter 9 is shifted by the shutter actuating pin 14g, and the magnetic disc 8 accommodated in the cartridge case 7 is exposed from the opening 7b and window openings 9a. In addition, since the locking of the locking claw 14h and stopper 11c is displaced in accordance with the rotation of the rotating member 14, the slide plate 11 is shifted to the forward position by the tension spring 13, and the eject button 4 fixed to the mounting piece 11 is projected from the front panel 3. As a consequence, as shown in FIG. 45, each of the projections 12h of the holder 12 move to the lower ends of each of the cam grooves 11e of the slide plate 11, and the holder 12 moves to a descending position, i.e., a loading position together with the disc cartridge 6. In addition, since the first support arm 19b is brought into abutment with the swelling portion 12b of the holder 12, the hold case 19 urged by the load spring 35 also moves downward in accordance with the downward movement of the holder 12, and the lower magnetic head 20 on the carriage 18 side and the upper magnetic head 21 on the hold case 19 side are brought into contact with the magnetic disc case 8, respectively. The first support arm 19b alone is brought into abutment with the swelling portion 12b of the holder 12, and reaction force thereof acts as a torsion moment on the leaf hinge spring 31. As stated above, however, since one side edge of the leaf hinge spring 31 is pressed by the notch 18u of the spring support portion 18g, deformation of the leaf hinge spring 31 is prevented. If a large external force should act on the apparatus due to the falling thereof, the second support arm 19c of the hold case strikes against the swelling portion 12b of the holder 12, so that damage of both magnetic heads 20 and 21 from a collision therebetween is prevented.

When the stepping motor 26 is actuated to rotate the screw shaft 25 after the disc cartridge 6 is shifted to the loading position, the rotation of the screw shaft 25 is transmitted to the carriage 18 through the projected portion 18o, and the head transport mechanism 17 moves in the radial direction of the magnetic disc 8 along the guide shaft 24. In addition, by actuating the spindle motor 38, the magnetic disc 8 is rotated, so that information from the lower and upper magnetic heads 20 and 21 is recorded/reproduced on or from the magnetic disc 8.

In the case of ejecting the disc cartridge 6 located at the loading position, the eject button 4 projecting from the front panel 3 is pushed so as to allow the slide plate 11 to be shifted to the backward position against the resilient force of the tension spring 11. Then, the holder 12 moves upward from the loading position of FIG. 46 to the unloading position of FIG. 45, the disc cartridge 6 is ejected from the insertion opening 3a of the front panel 3 by the rotating member 14 rotating in a counterclockwise direction of FIG. 47, and the slide plate 11 is maintained at the backward position again by the locking claw 14h of the rotating member 14 being locked by the stopper 11c of the slide plate 11.

According to the above-described embodiment, the spindle 15 is embedded in the chassis 10, and the rotating member 14 is rotatably supported on the spindle 15. However, the rotating member 14 may be supported by a projection raised from the bottom of the chassis 10. In this case, the spindle 15 can be omitted and the number of parts can be reduced.

As described above, according to the present invention, the shutter actuating pin for opening and closing the shutter of the disc cartridge, and the locking claw for maintaining the slide plate at the backward position are integrally formed with the rotating member, the number of parts and the number of assemblers can be reduced, thereby providing a low-cost magnetic recording/reproducing apparatus.

In addition, when the bent portion is formed at the end of the torsion coil spring for rotationally urging the rotating member, and the bent portion is used as the wrong insertion preventive spring for preventing wrong insertion of the disc cartridge, the number of springs is also reduced. Therefore, the cost of the apparatus can be further decreased.

Further, when the slits are formed at the upper portion of the rotating member, and the torsion coil spring is wound around the supporting walls separated by the slits, incorporating operation of the torsion coil spring becomes simplified, whereby assembly workability can be improved.

What is claimed is:

1. A magnetic recording/reproducing apparatus for recording/reproducing from a disc cartridge, the apparatus comprising:

a slide plate mounted on a chassis such that the slide plate slides between a forward position and a backward position, and is urged toward the forward position by a spring;

a holder movably connected to the slide plate such that the holder moves between an unloaded position and a loaded position in cooperation with movement of said slide plate;

a rotating member rotatably supported on the chassis, said rotating member having a locking claw and a shutter actuating member formed integrally therewith; and a torsion coil spring wound around said rotating member, the torsion coil spring having a first end retained by said shutter actuating member and a second end retained by a retainer hole formed in said holder, said second end having a bent portion forming an incorrect insertion preventative spring for preventing incorrect insertion of the disc cartridge;

wherein, before loading of the disc cartridge, said slide plate is locked by said locking claw in said backward position, so that said holder is maintained at said unloading position, whereas, when the disc cartridge is loaded, said rotating member is rotated by the disk cartridge, thereby releasing the locking claw from said slide plate such that said holder is shifted to said loading position while said shutter actuating member opens a shutter of the disc cartridge.

2. A magnetic recording/reproducing apparatus according to claim 1, wherein said rotating member further comprises first and second supporting walls separated by slits extending in the axial direction from the upper portion of said rotating member, said first supporting wall being thicker than said second supporting wall, and said torsion coil spring is wound around said first and second supporting walls.

3. A magnetic recording/reproducing apparatus according to claim 1, wherein:

said holder defines a relief opening;

said shutter actuating member is disposed below said holder, and includes an extension which projects through said relief opening; and said first end of said torsion coil spring engages said extension.

4. A magnetic recording/reproducing apparatus according to claim 3, further comprising fallout preventing means for preventing said second end of said torsion coil spring from disengaging said retainer hole.

5. A magnetic recording/reproducing apparatus according to claim 1, wherein:

said shutter actuating member includes a central portion and an arm extending outwardly from said central portion, and an actuating pin fixed to a distal end of said arm; and said free end of said torsion coil spring engages said actuating pin.

* * * * *

UNITED STATES PATENT AND TRADEMARK OFFICE
CERTIFICATE OF CORRECTION

PATENT NO. :  5,724,210
DATED      :  March 3, 1998
INVENTOR(S) : Toru Sawada

It is certified that error appears in the above-indentified patent and that said Letters Patent is hereby corrected as shown below:

In claim 1, line 26, replace "disk" with --disc--.

Signed and Sealed this

Fifteenth Day of December, 1998

Attest:

BRUCE LEHMAN

Attesting Officer

Commissioner of Patents and Trademarks